United States Patent
Shoji et al.

(10) Patent No.: US 7,287,273 B2
(45) Date of Patent: *Oct. 23, 2007

(54) INDIVIDUAL AUTHENTICATION METHOD USING INPUT CHARACTERISTIC OF INPUT APPARATUS BY NETWORK, PROGRAM THEREOF, AND RECORDING MEDIUM CONTAINING THE PROGRAM

(75) Inventors: Koichiro Shoji, Zama (JP); Takashi Nozaki, Zama (JP)

(73) Assignee: Science Park Corporation, Zama-shi (JP)

( * ) Notice: Subject to any disclaimer, the term of this patent is extended or adjusted under 35 U.S.C. 154(b) by 384 days.

This patent is subject to a terminal disclaimer.

(21) Appl. No.: 10/504,415

(22) PCT Filed: Feb. 17, 2003

(86) PCT No.: PCT/JP03/01634

§ 371 (c)(1),
(2), (4) Date: Aug. 13, 2004

(87) PCT Pub. No.: WO03/069492

PCT Pub. Date: Aug. 21, 2003

(65) Prior Publication Data

US 2005/0229000 A1    Oct. 13, 2005

(30) Foreign Application Priority Data

Feb. 15, 2002  (JP) .............................. 2002-037848

(51) Int. Cl.
 G06F 15/16  (2006.01)
 H04K 1/00  (2006.01)
(52) U.S. Cl. ..................... 726/7; 713/182; 713/186
(58) Field of Classification Search ..................... None
See application file for complete search history.

(56) References Cited

U.S. PATENT DOCUMENTS 5,557,686 A * 9/1996 Brown et al. ................ 382/115

(Continued)

FOREIGN PATENT DOCUMENTS

AU          718480         3/2000

(Continued)

OTHER PUBLICATIONS

Kohonen, T., "Improved versions of Learning Vector Quantization", 1990 IJNN International Joint Conference on Neural Network, 1990, vol. 1, pp. 545-550.*

(Continued)

*Primary Examiner*—Ayaz Sheikh
*Assistant Examiner*—Trang Doan
(74) *Attorney, Agent, or Firm*—Westerman, Hattori, Daniels & Adrian, LLP.

(57) ABSTRACT

The present invention provides a personal authentication method using each individual's characteristics exhibited when entering data from an input device of an electronic computer in a network system, and a program for the personal authentication method, and further a recording medium for the program.

To perform personal authentication of a user using an electronic computer by using device actuation characteristics of the user when the user actuates the keyboard, is obtained in a kernel mode that is an operating mode in which all instructions of an operating system are executable, and the actuation time is transmitted to a personal authorizing server by a network system, in the personal authorizing server analyzed to grasp the device actuation characteristics of the user exhibited when actuating the keyboard, and compared the device actuation characteristics with a personal information stored in a database of the personal authorizing server.

27 Claims, 22 Drawing Sheets

U.S. PATENT DOCUMENTS

| | | |
|---|---|---|
| 5,768,387 A | 6/1998 | Akiyama et al. |
| 2003/0065626 A1* | 4/2003 | Allen .......................... 705/76 |

FOREIGN PATENT DOCUMENTS

| | | |
|---|---|---|
| CN | 1299103 | 6/2001 |
| DE | 195 29 321 | 2/1996 |
| EP | 0 986 209 | 3/2000 |
| JP | 8-55021 | 2/1996 |
| JP | 2000-92046 | 3/2000 |
| JP | 2000-132514 | 5/2000 |
| JP | 2000-132515 | 5/2000 |
| JP | 2000-305654 | 11/2000 |
| JP | 2001-175871 | 6/2001 |
| JP | 2001-356871 | 12/2001 |

OTHER PUBLICATIONS

DOS/V Power Report (JP), Impress Corp., Oct. 1, 1999, vol. 9, No. 10, p. 16. Cited in the int'l. search report.

T. Kohonen; 1990 IJCNN Int'l. Joint Conference on Neural Network, 1990, vol. 1, pp. 545-550. Cited in the int'l. search report.

* cited by examiner

Fig. 18
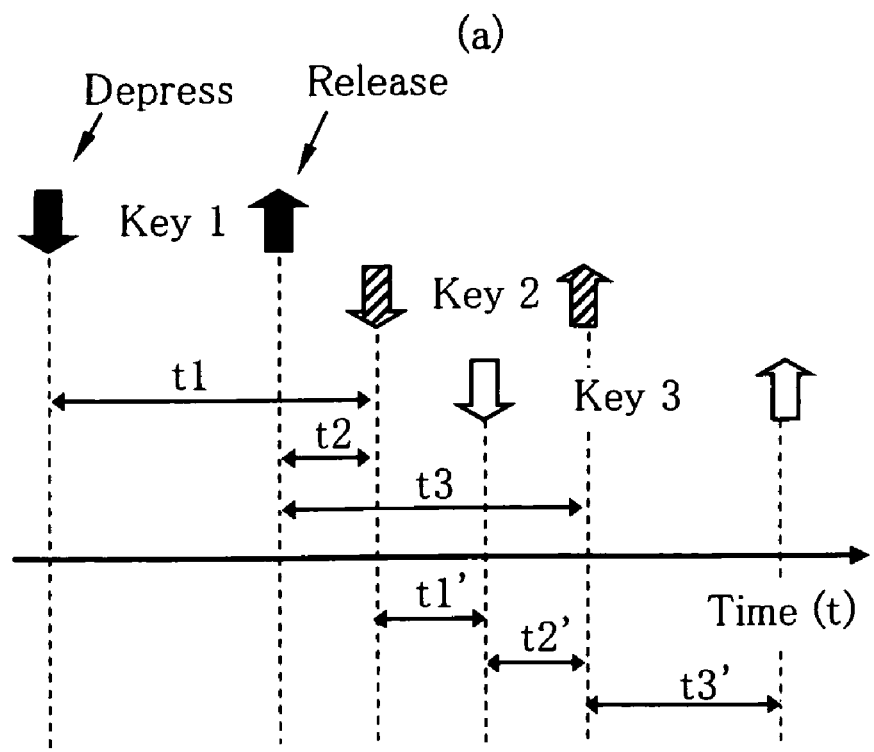
(a)
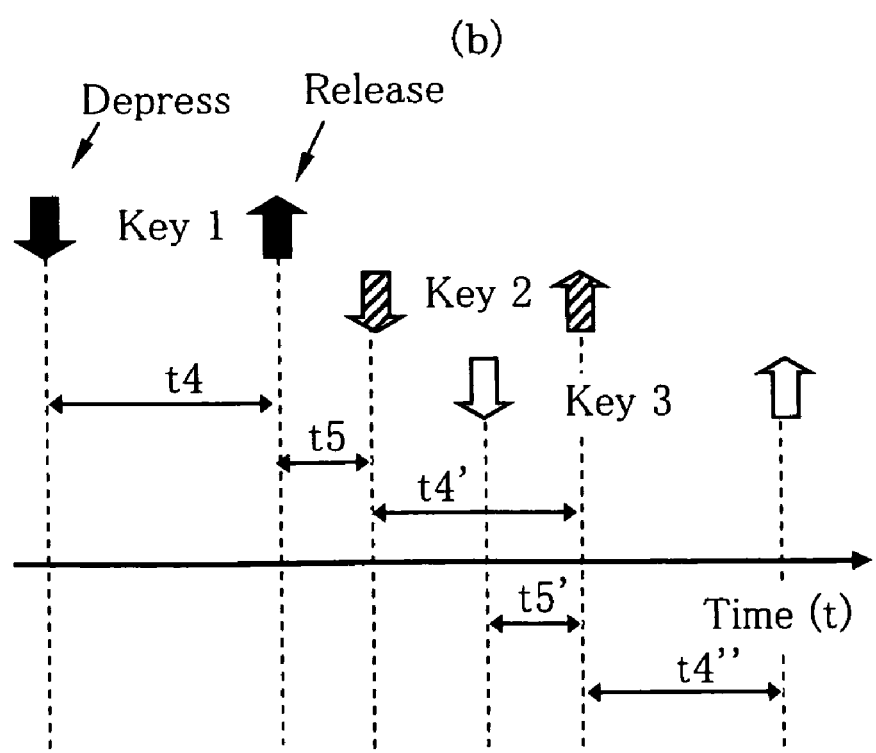
(b)

Fig.19

Example of format of input data

| 210 | 211 | 212 | 213 | 214 |
|---|---|---|---|---|
| Number | Time | IP | Key code | Depress/Release |
| 0 | 1383274448 | 192.168.1.245 | 35 | 0 |
| 1 | 1384275888 | 192.168.1.245 | 23 | 0 |
| 2 | 1384676464 | 192.168.1.245 | 35 | 1 |
| 3 | 1385077040 | 192.168.1.245 | 19 | 0 |
| 4 | 1385377472 | 192.168.1.245 | 23 | 1 |
| 5 | 1385878192 | 192.168.1.245 | 30 | 0 |
| 6 | 1387180064 | 192.168.1.245 | 19 | 1 |
| 7 | 1387180064 | 192.168.1.245 | 30 | 1 |
|   |   |   | 37 | 1 |

Fig.22

| | | Identification result 221 | | | | | |
|---|---|---|---|---|---|---|---|
| | | A | B | C | D | E | F | G |
| Read Files | A | 75% | 6% | 0% | 0% | 13% | 6% | 0% |
| | B | 0% | 100% | 0% | 0% | 0% | 0% | 0% |
| | C | 0% | 24% | 71% | 0% | 0% | 6% | 0% |
| | D | 7% | 0% | 7% | 79% | 7% | 0% | 0% |
| | E | 22% | 0% | 11% | 17% | 50% | 0% | 0% |
| | F | 0% | 8% | 15% | 0% | 0% | 77% | 0% |
| | G | 13% | 13% | 0% | 0% | 7% | 0% | 67% |

INDIVIDUAL AUTHENTICATION METHOD USING INPUT CHARACTERISTIC OF INPUT APPARATUS BY NETWORK, PROGRAM THEREOF, AND RECORDING MEDIUM CONTAINING THE PROGRAM

TECHNICAL FIELD

The present invention relates to a personal authentication method using each individual's characteristics exhibited when entering data from an input device, e.g. a keyboard, of an electronic computer in a network system, and also relates to a program for the personal authentication method and a recording medium for the program. More particularly, the present invention relates to a personal authentication method using each individual's characteristics exhibited when entering data from an input device in a network system, which enables personal authentication to be performed by utilizing personal characteristics, peculiarity, etc. of each individual exhibited when entering keys of a keyboard to enter a password for personal authentication, for example. The present invention also relates to a program for the personal authentication method and a recording medium for the program.

BACKGROUND ART

There has heretofore been a password authentication method wherein personal authentication is performed on the basis of a predetermined password entered by each individual to access an electronic computer or the like (this method will hereinafter be referred to as "method 1"). In many cases, a password is entered from a device, e.g. a keyboard, which is connected to an electronic computer. In such a case, a password is entered by depressing a key button corresponding to each symbol (a letter, a numeral, or a mark) constituting the password. If there is an error in entering the password, it can be rewritten by using a function key such as "Back-Space".

There is also known a password authentication method using each individual's characteristics exhibited when entering data from a keyboard, wherein information concerning the time when the user types keys of a keyboard is used as one of authentication elements (this method will hereinafter be referred to as "method 2"). The method 2 uses, for example, a time (time 1) at which the user begins to depress a key of the keyboard and a time (time 2) at which the user finishes depressing the key. The length of time from when one key is depressed until another key is subsequently depressed is previously registered for each user and used as one of authentication elements. There has also been proposed a password authentication method in which the length of time (time 3) that the user continues to depress one key and the length of time (time 4) from when a user's finger is removed from one key until his/her finger is removed from another key depressed subsequently are added to the authentication elements.

The above-described password authentication is performed by a special-purpose program prepared therefor. The special-purpose program runs in the user mode (see the description given later) to obtain a time at which the user makes access from the keyboard. To be precise, information concerning data entry time such as the above-described time 1 and time 2 is obtained from a device driver for controlling the input device from which the user has accessed the electronic computer. Next, the device drivers of the conventional electronic computer, the operating modes thereof, etc. will be described.

The electronic computer comprises many hardware resources such as a central processing unit (CPU), storage devices (a memory, a hard disk, etc.), input devices (a keyboard, a mouse, etc.), output devices (a display, etc.), and peripheral devices (a printer, a scanner, etc.) that are connected through card slots. These hardware devices operate under the control of an OS (Operating System) stored in the storage device.

Various application programs used in the electronic computer run under the OS. The OS controls all the operations of the electronic computer and absorbs differences in specifications of different hardware to provide an environment common to the application programs. In other words, the OS is software that provides basic functions used mutually by many application programs, e.g. input/output functions such as keyboard entry and screen output, and management of the disk and the memory, and controls the whole system of the electronic computer. The OS is also known as "basic software".

The hardware devices of the electronic computer are produced by a plurality of manufacturers, and the specifications thereof may differ among manufacturers. It is desirable for developers of programs using the electronic computer to develop application programs without noticing the differences in specifications of the hardware. The OS absorbs the differences in specifications of the hardware to provide an environment common to the application programs.

The developers of the application programs can save the time and labor for development and unify the operability of the application programs by making use of the function provided by the OS. An application program developed for a certain OS can basically be used in any electronic computer in which the OS can run.

There are a large number of different kinds of OS, represented by MS-DOS (registered trademark), UNIX (registered trademark), Linux, FreeBSD (registered trademark), etc. Among them, the Windows series available from Microsoft is the most popular OS for use by corporations and general home users. Mac OS (registered trademark) available from apple is widely used in the DTP industry and the multimedia industry. Servers of corporations and scientific institutions often use UNIX-based OS's developed by various companies and UNIX-based OS's such as Linux and FreeBSD, which are distributed without charge. In recent years, Windows NT/2000 (registered trademark) available from Microsoft has been increasing the share of the market as an OS for servers.

[Conventional Architecture]

FIG. 13 outlines the architecture of the Windows NT/2000 (registered trademark) as a typical OS. As will be understood from FIG. 13, Windows NT/2000 has generally a hierarchical structure comprising hardware 2, an OS 3, and an application program 4 that implements a function requested by the actual user. A microkernel 51 is a program for performing general management of the OS 3. Various software programs (kernel mode software) that run in layers above the layer of the microkernel 51 and the microkernel 51 for the core constitute a kernel mode 8 (see the description given later). The application program 4 in the topmost layer runs in the user mode 9 (see the description given later).

The OS 3 has a hierarchical structure that, roughly speaking, comprises an executive 50, a microkernel 51, and a hardware abstraction layer (HAL) 52. The HAL 52 is located in a layer immediately above the hardware 2. The HAL 52 is a program designed to attach importance to the control of hardware. The program absorbs differences in specifications of various hardware devices such as processors to provide the same environment (independent of models) for services in higher-order layers (the microkernel 51, the executive 50, etc.).

The microkernel 51 provides overall basic functions of the system. The executive 50 is an integrated whole of programs for implementing the provision of main services from the OS 3 by utilizing service functions provided by the microkernel 51 and the HAL 52. The executive 50 includes typical executive programs such as a cache manager 53, an object manager 54, a process manager 55, a memory manager 56, and an I/O manager 57.

The object manager 54 is a program for supervising a running object (a program for implementing a function to be performed) and executing control and adjustment therefor. The process manager 55 is a program for supervising a process in progress (a program for performing only a certain function) and making adjustment therefor. The cache manager 53 and the memory manager 56 are programs for controlling and adjusting memory and virtual memory. The I/O manager 57 is a program for supervising and controlling the input/output function of the OS 3. The mode in which the electronic computer operates under the executive 50 is called "kernel mode 8".

In the kernel mode 8, any instruction for running the OS 3 is executable. If an erroneous instruction is executed, there may be an adverse effect on the whole system. Further, the functions of the OS 3 include a user mode 9 that is completely open to the user to run an application program, etc. In the user mode 9, instructions for running the OS 3 are limited so that an adverse effect is not exerted on the system. Because the system automatically intercepts instructions that may have an adverse effect on the system, an environment easy for the user to use is provided.

However, the provision of such a limitation is the same as limiting the functions of the OS 3. Therefore, the application program 4 that runs in the user mode 9 cannot directly access any part relating to the hardware 2 and has to pass through the kernel mode 8 to access the hardware 2. The kernel mode 8 enables full use of the functions of the OS 3 and also allows complete access to each input/output device. In addition, a program that runs in the kernel mode 8 is processed with priority to a program that runs in the user mode 9. Thus, high performance can be obtained.

Device drivers 5 belong to the OS 3. The device drivers 5 are software programs for managing external hardware devices of the electronic computer. The device drivers 5 run in the kernel mode 8. Usually, there is only one device for each device driver 5 that has the same attributes as those of the device driver 5. The application program 4 that runs in the user mode 9 has to pass through the device drivers 5 to access the respective devices.

For example, in a case where, as shown in FIG. 14, data is transferred from a device A to a device B, the flow of the data is as follows: "device A"→"device driver A"→(switching the operating mode from the kernel mode 8 to the user mode 9) "application program 4" (switching the operating mode from the user mode 9 to the kernel mode 8)→"device driver B"→"device B". Thus, the system carries out processing while switching the operating mode from the kernel mode 8 to the user mode 9 or from the user mode 9 to the kernel mode 8.

The switching between the user mode 9 and the kernel mode 8 is time-consuming processing. When a large amount of data such as image data is transferred, the transfer speed becomes slow, and hence an increased length of time is required to transfer the data. Accordingly, it is difficult to make the transfer speed at the application level. The reason for this is that it is necessary to switch between the user mode 9 and the kernel mode 8 for each processing of the application program 4.

Here, let us explain the conventional operating procedure executed to transfer data between devices. FIG. 14 outlines the relationship between the application program 4 and the device drivers 5 on the one hand and the operating modes 8 and 9 on the other. As will be understood from the figure, the application program 4 runs in the user mode 9.

The device drivers 5 are incorporated in the OS 3 to run in the kernel mode 8. Devices 6 constituting the hardware 2 of the electronic computer comprise various internal devices and external devices connected to the electronic computer. Each device 6 is controlled from a device driver 5 specific thereto. In other words, all access to the devices 6 is made through the respective device drivers 5. The device drivers 5 run in response to instructions from the application program 4 through the OS 3.

Next, the flow of data transmission will be explained with reference to the flowchart of FIG. 15. Let us explain the flow of data as transferred from the device A to the device B by the application program 4, which runs in the user mode 9, while comparing the operating modes 8 and 9 of the system. First, the application program 4 sends a data transfer request (instruction) (S50).

At this time, a data transmission request is sent to the device A (S51), and a data reception request is sent to the device B (S52). The operating mode of the system is switched from the user mode 9 to the kernel mode 8. The device driver A receives the data transmission request (S53) and transmits it to the device A (S54). The device A receives the data transmission request (S55) and transmits data (S56). The device driver A receives the transmitted data (S57) and internally processes the data (S58) and then transmits the processed data to the application program 4 (S59).

The operating mode of the system is switched from the kernel mode 8 to the user mode 9. The application program 4 receives and processes the data (S60 and S61) and transmits the processing result to the device driver B (S62). The operating mode of the system is switched from the user mode 9 to the kernel mode 8 again. The device driver B receives the data (S63) and internally processes the received data (S64) and then transmits the processing result to the device B (S65).

The device B receives the data (S66) and sends information indicating the receipt of the data to the device driver B (S67). The device driver B receives the data receipt information (S68) and informs the application program 4 of the completion of the data transfer (S69). The system is switched to the user mode 9. The application program 4 receives the data transfer completion information (S70) and starts the next processing. Thus, the series of data transfer processing operations ends (S71).

Thus, data is transferred as follows: "device A"→"device driver A"→(switching between the operating modes) "application program 4" (switching between the operating modes) →"device driver B"→"device B". During the data transfer, the system operates while repeatedly switching the operating mode between the kernel mode 8 and the user mode 9. As the amount of data to be handled increases, the number of operating mode switching operations increases.

Further, when another application program is simultaneously running on the system, the system switches between the operating modes for this application program. Consequently, the number of times of switching between the operating modes performed in the system becomes large as a whole, causing a delay in the execution processing of the application programs. The increase in the number of times of switching between the operating modes is likely to cause a reduction in the speed of data transmission/reception processing. In particular, when there is a strong demand for real-time execution capability for image processing or the like, the increase in the number of times of switching between the operating modes may disorder the image displayed on the screen.

To ensure the required system performance in the above-described system, it is important to advance the technology for developing and designing hardware devices and the technology for developing the device drivers 5 for controlling the pieces of hardware 2. To transfer a large amount of data such as image data, in particular, it is desirable to minimize the number of times of switching between the user mode 9 and the kernel mode 8 to thereby increase the speed of data transfer. When there is a strong demand for ensuring the integrity of data, it is desirable that data should be transferred in the kernel mode 8, in which no data can be touched by the user. Particularly, when user authentication is performed by using a password, the integrity of password data, which is confidential data, is very important.

WO98/47074 discloses a data transfer technique wherein in the kernel mode, control is shown between drivers in a hierarchical structure. However, this document discloses nothing about the personal authentication technique of the present invention.

Next, the procedure for personal authentication will be described.

Next, let us consider a case where a user enters a password (assumed to be "PIANO", for example) from a keyboard connected to an electronic computer, and a special-purpose application program for password authentication performs authentication. In this case, the keyboard corresponds to the device 6, and the special-purpose application program for password authentication corresponds to the application program 4. The keyboard driver for the keyboard corresponds to the device driver 5.

The procedure in which the application program 4 obtains information concerning the key actuation for entering from the keyboard will be described below by using the flowchart of FIG. 16. Information concerning the key actuation includes information as to which key has been depressed or released.

First, the application program 4 is started (user mode; S80). The application program 4 instructs the keyboard driver to transmit data entered from the keyboard (user mode; S81). The keyboard driver receives the instruction (mode switched to kernel mode; S82) and transmits the transmission request of key actuation data to the keyboard (kernel mode; S83).

The keyboard receives the key actuation data transmission request (S84) and transmits key actuation data (S85). The keyboard driver receives the data (kernel mode; S86) and internally processes the received data (S87) and then transmits the processed data to the application program 4 (kernel mode; S88). The application program 4 receives the key actuation data from the keyboard driver (mode switched to user mode; S89) and also receives system clock data to grasp the time of the key actuation (S90).

Then, the application program shifts to the next processing (S91). Thus, the series of processing operations ends (S92). When it is necessary to obtain key actuation data again, the procedure from S80 to S92 is repeated. Thus, a series of operations for entering one letter with a key is performed while switching between the user mode and the kernel mode. For the subsequent key actuation, similar operations are repeated. After all the letters of the password have been received with the user and kernel modes switched from one to another as stated above, the received data is encrypted to perform authentication.

The above-mentioned method 1 has the disadvantage that because the password readily becomes known to others, it is easy for another person to make unauthorized access. This problem is overcome by the above-mentioned method 2, which uses each individual's characteristics exhibited when entering data from an input device, for example, each individual's peculiar way of operating a keyboard. However, once the user has logged in to the electronic computer, anyone can use it. For example, when the user leaves the electronic computer for a while after logging in, it is possible for another person to access the computer or to tamper with it by impersonating the user.

When another application program is running on the electronic computer, the special-purpose application program for password authentication receives information concerning the entry of data from the device driver. The application program performs the operation receiving information while switching between the user mode and the kernel mode. Therefore, it is impossible to obtain accurate data entry time, and hence the data entry time error becomes large. This may cause a reduction in the rate of authentication of the authorized user. To increase the rate of authentication of the authorized user, the authentication accuracy has to be undesirably lowered.

FIG. 9 is a graph in which the time that the user depresses a key to enter a letter from a keyboard is plotted along the abscissa axis, and the length of time that the user continues to depress the key is plotted along the ordinate axis. The graph (a) in FIG. 9 is assumed to be a true graph showing the time when the user enters data. If time errors of an individual that may arise when a certain user having entry characteristics enters data are taken into consideration, the time that the user depresses one key can be substantially graphed in the form of a quadrangle 60.

When the application program is used to obtain the time that the user depresses keys, as shown in the graph (b) of FIG. 9, the error range of time when the user enters data undesirably enlarges as shown by ellipses 61. When the system is executing processing being imposed a heavy load on the central processing unit and the like of the electronic computer, for example, when the system is executing another application program, the time lag increases as shown by lines 62 and 63. If the time lag becomes large, the user's original data of entry characteristics may fail to appear.

Further, an application program that implements authentication as stated above is one that runs in the user mode. With such an application program, a time difference undesirably occurs in the extraction of timing at which an individual types a key. It will be clear from the foregoing description that there is a difference between timing extraction performed when almost no application program is running in the user mode and timing extraction performed when an application program executing processing of a large amount of data is running in the user mode. Therefore, it is necessary to preset the error range larger than is actually needed for user authentication. This may lead to authentication accuracy degradation.

Japanese Patent Application Unexamined Publication (KOKAI) No. 2000-305654 proposes a system in which personal authentication is performed by using each individual's characteristics exhibited when entering data from a keyboard. With this system, however, it is difficult to perform accurate timing extraction because of a large number of times of switching the kernel mode as stated above.

With the above-mentioned technical background, the present invention was made to attain the next objects.

An object of the present invention is to provide a personal authentication method using each individual's characteristics exhibited when entering data from an input device of an electronic computer in a network system, wherein personal authentication of a user of the electronic computer can be performed in a kernel mode that is an operating mode of an OS used in the electronic computer. The present invention also provides a program for the personal authentication method and a recording medium for the program.

Another object of the present invention is to provide a personal authentication method using each individual's characteristics exhibited when entering data from an input device of an electronic computer in a network system, wherein the time that a user of the electronic computer actuates the input device, e.g. a keyboard of an electronic computer, can be extracted accurately. The present invention also provides a program for the personal authentication method and a recording medium for the program.

Still another object of the present invention is to provide a personal authentication method using each individual's characteristics exhibited when entering data from an input device of an electronic computer in a network system, wherein the confidentiality of data can be protected and safe transfer of data can be achieved by using an interface common to an application program and device drivers. The present invention also provides a program for the personal authentication method and a recording medium for the program.

Still another object of the present invention is to provide a personal authentication method using each individual's characteristics exhibited when entering data from an input device of an electronic computer in network system, wherein an unauthorized access can be prevented by supervising on-line a user of the electronic computer via a network system. The present invention also provides a program for the personal authentication method and a recording medium for the program.

The personal authentication method using each individual's characteristics exhibited when entering data from an input device of an electronic computer in network system and the program for the personal authentication method and further the recording medium for the program according to the present invention have the following advantages.

In the present invention, collection of data about the time of actuation of a keyboard or the like for personal authentication of a user of the electronic computer is performed in a kernel mode that is an operating mode of an OS used in the electronic computer via a network system. Therefore, accurate timing can be extracted, and hence the reliability of the personal authentication is enhanced.

In the present invention, personal authentication is performed by using an interface common to an application program and device drivers, and utilizing the program of the interface driver via a network system. Therefore, the confidentiality of data is protected, and safe transfer of data can be achieved.

In the present invention, a user of the electronic computer can be authorized personally and supervised on-line via a network system. Therefore, an unauthorized access can be prevented.

DISCLOSURE OF THE INVENTION

The personal authentication method for use in a network system, and the program for the personal authentication method and further the recording medium for the program according to the present invention are characterized as follows;

The network system comprises an electronic computer connected to the network system, and a server storing a database comprising personal information concerning a user, in the electronic computer; when the user actuates an input device, an actuation time is obtained in a kernel mode, and input information including the actuation time is transmitted to the server. The server receives the input information, analyzes the input information, and obtains actuation characteristics. The server performs personal authentication of the user by comparing the actuating characteristics with said personal information.

Preferably, the personal authentication uses a neural network technique.

Preferably, the neural network technique is a learning vector quantization method.

Preferably, the learning vector quantization method obtains feature vectors representing the features of teacher data comprising the above-described personal information by learning. The learning is performed by updating the feature vectors according to the following equation:

$$m_i(t+1)=m_i(t)-\alpha(t)[x(t)-m_i(t)]$$

$$m_j(t+1)=m_j(t)+\alpha(t)[x(t)-m_j(t)]$$

$$m_k(t+1)=m_k(t) \text{ for } k \neq i,j$$

$$0<\alpha(t)<1 \quad \text{(Eq. 1)}$$

where $m_i$ and $m_j$ denote feature vectors at the closest distance to teacher data x, and t is the number of times of the learning, wherein $m_i$ is a closest feature vector belonging to a class different from that of the teacher data x, and $m_j$ is a closest feature vector belonging to the same class as that of the teacher data x.

Then, the distance between input data including the actuation time and the feature vectors is obtained to identify the user.

The personal authentication program for use in a network system is characterized as follows. The network system comprising an electronic computer connected with a plurality of devices, including a first network card for connecting to the network system, an input device, and operated by an operating system, and a server comprising a second network card for connecting to the network system, and storage means for storing a database, including personal information concerning a user using the electronic computer. The personal authentication program is allowing the network system to realize personal authentication of the user. The personal authentication program comprises a program for the electronic computer and a program for the server. The program for the electronic computer is a program for allowing the electronic computer to realize an obtaining function comprising: when the user actuates the input device, an actuation time when user actuates the input device is obtained on a kernel mode that is an operating mode in which all instructions of the operating system are executable, a transmitting data for transmitting to the server is produced by using input data including the actuation time, the transmitting data is transmitted to the network system by the first network card. The program for the server is a program for allowing the server to realize next functions: a analyzing function for receiving the transmitting data by the second network card, and obtaining actuation characteristics of the user actuating the input device by analyzing the input data, and a authentication function for authenticating the user by collating the actuating characteristics with the personal information.

Preferably, said obtaining function to obtain has next functions: an application interface function for receiving commands from an application program executed in said electronic computer, and informing said application program of executed results executing by these commands, wherein said electronic computer has device driver for controlling said device, an interface function for obtaining input information by accessing to said device driver, a data processing function for producing said transmitting data by grasping said actuating time by adding information concerning time of said access to said input information, a network transmitting function for performing transmitting and receiving said transmitting data to said first network card, a flow controlling function for executing commands of said server or transmitting to said application interface, after analyzing said transmitted data which is received from said server.

Preferably, said data processing function comprising: an encryption function to encrypt said transmitting data, and a decryption function to decrypt said receiving data.

Preferably, said flow controlling function is, in the case of an unauthorized data in said receiving data which shows that said user is unauthorized, stopping, stopping for a time, or informing an administrator of said electronic computer of information of unauthorized.

Preferably, said input device is a keyboard.

Preferably, the actuating time is a time interval information from when one key of the keyboard is depressed until this key is released; the actuating time is at least one time selected from the group consisting of: a first time that is a time interval from when one key of said keyboard is depressed until this key is released; a second time that is a time interval from when one key of said keyboard is depressed until another key is subsequently depressed; a third time that is a time interval from when one key of said keyboard is released until another key is subsequently depressed; and a fourth time that is a time interval from when one key of said keyboard is released until another key is subsequently released.

Preferably, said actuating time is time of actuating function key of said keyboard.

Preferably, said personal authentication function uses a learning vector quantization method, which is a neural network technique, and comprises a learning step and an identification step.

Preferably, the learning step comprises the following steps: a first step of reading the personal information; a second step of producing feature vectors representing the features of the personal information; a third step of learning the feature vectors to obtain optimal feature vectors; and a fourth step of outputting the optimal feature vectors.

Preferably, the third step comprises the following steps: a fifth step of calculating the distance between the personal information x and each of the feature vectors to obtain a feature vector $m_i$ at the shortest distance to the personal information x; a sixth step of obtaining the class to which the feature vector $m_i$ belongs; a seventh step of comparing the class obtained at the sixth step with the class of the personal information x; an eighth step of updating the feature vector according to the following equation when the result of the comparison made at the seventh step shows that the class obtained at the sixth step is the same as the class of the personal information x, $$m_j = m_j + \sigma[x - m_j], \ 0 < \sigma < 1;$$

a ninth step of updating the feature vector according to the following equation when the result of the comparison made at the seventh step shows that the class obtained at the sixth step is different from the class of the personal information x, $$m_j = m_j - \sigma[x - m_j], \ 0 < \sigma < 1;$$

and a tenth step of repeating the learning at the fifth to ninth steps a predetermined number of times and of outputting the result of the learning as the optimal feature vectors.

Preferably, the identification step comprises the following steps: an eleventh step of reading the optimal feature vectors produced by the learning step; a twelfth step of reading input data including the actuation time; a thirteenth step of calculating the distance between the input data and each of the feature vectors; a fourteenth step of determining a feature vector at the shortest distance to the input data from the result of the calculation at the thirteenth step; and a fifteenth step of outputting the class of the feature vector at the shortest distance determined at the fourteenth step as identification of the user.

Preferably, said network system is an internet.

Preferably, said network system is a wireless communication network.

Preferably, a recording medium for the personal authentication program using characteristics exhibited when entering data from an input device in the network system.

Preferably, said database has a code for identifying said key, a time at which said key is depressed or released, and identification indicating that said key is depressed or released. Preferably, said identifying result is stored in a storing medium as produces a result file for each said user, or added to said result file.

Preferably, a process of the encryption or decryption performs using a special-purpose encryption/decryption card.

BRIEF DESCRIPTION OF THE DRAWINGS

FIG. 18 is a diagram showing time intervals for key read operation in the sixth embodiment.

FIG. 19 is a diagram showing an example of input data in the sixth embodiment.

FIG. 22 is a diagram showing an example of identification results in the sixth embodiment.

BEST MODE FOR CARRYING OUT THE INVENTION

Embodiments of the present invention will be described below.

(Common Interface Driver)

Figure 1:
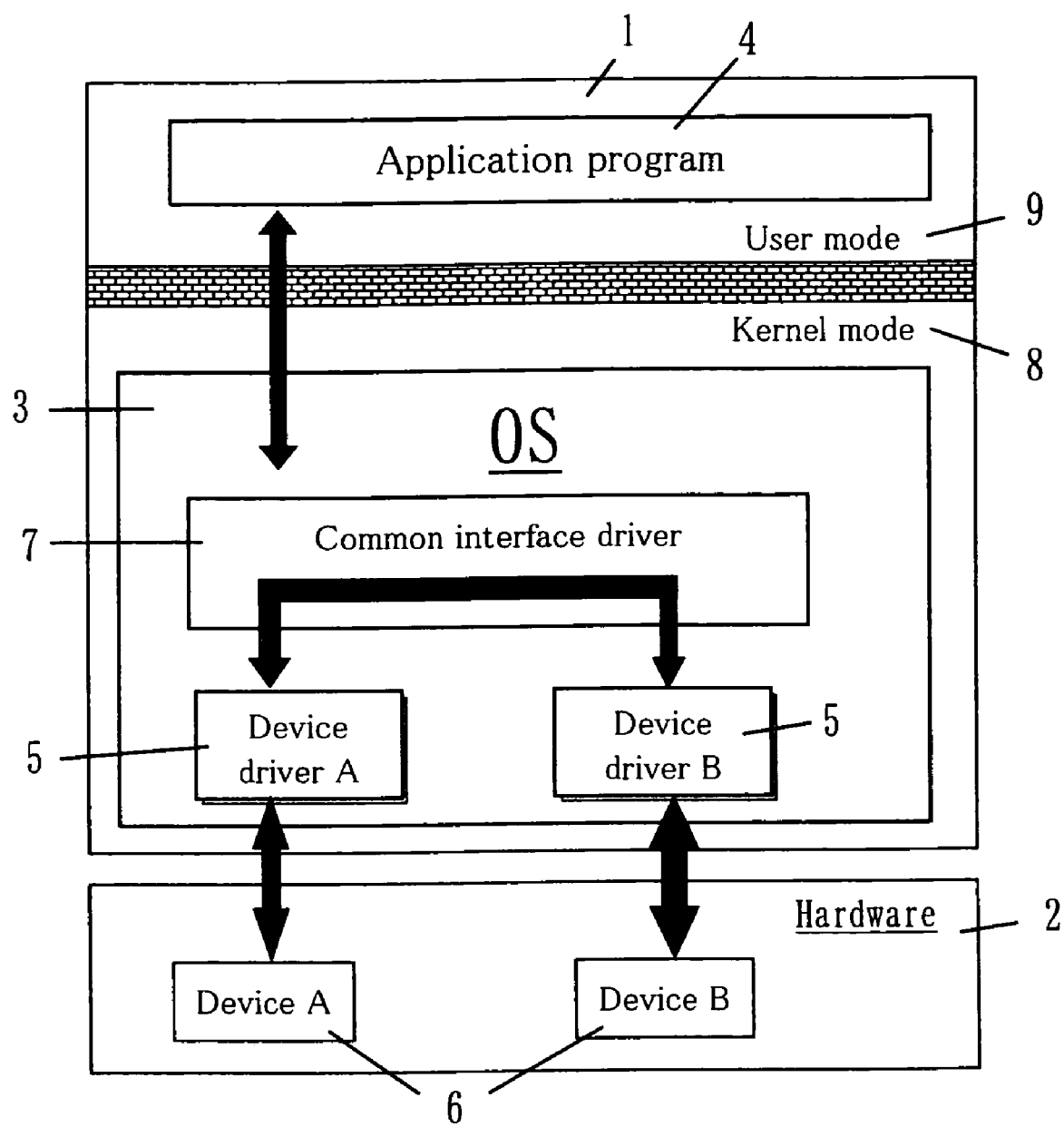
FIG. 1 is a conceptual view showing an embodiment of the present invention.
Figure 2:
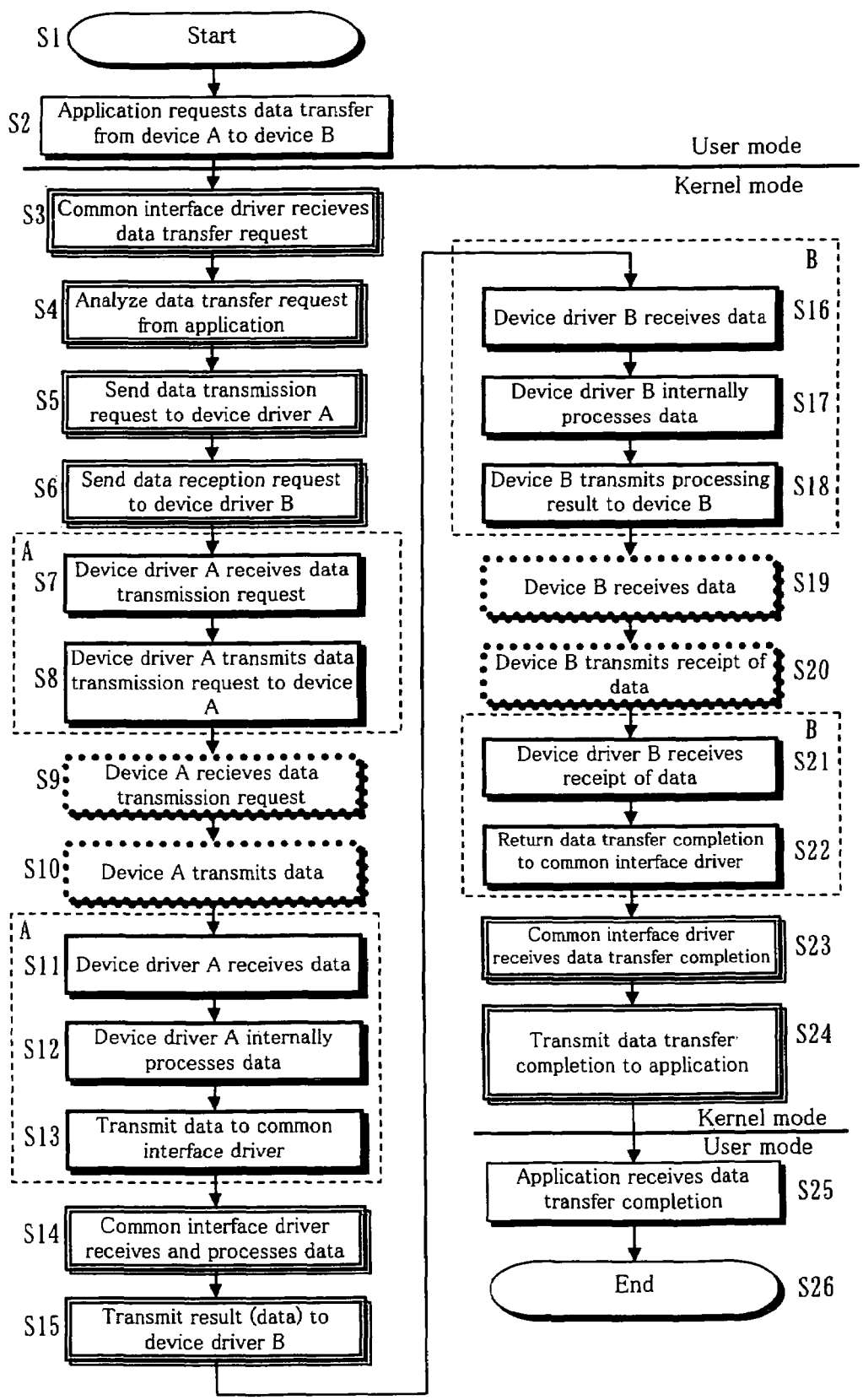
FIG. 2 is a flowchart showing the operation of the embodiment of the present invention.

FIG. 1 is a conceptual view showing an embodiment of an interface driver program used in an electronic computer according to the present invention. FIG. 1 is a conceptual view of an OS using a common interface driver. FIG. 2 is a flowchart showing the flow of data and instructions when data is transferred.

An electronic computer 1 comprises hardware 2 such as a CPU, memories, and peripheral devices. These pieces of hardware 2 are operated under control of an OS 3 stored in a storage device. An application program 4 used by an end user runs in an environment provided by the OS 3. The OS 3 includes device drivers 5 for controlling peripheral devices. The device drivers 5 control respective devices 6 according to instructions from the application program 4 to receive data from the device 6(A) and to transmit data to the device 6(B), for example.

In this embodiment, a common interface driver 7 serves as a window common to the device drivers 5 through which exchange of data between the application program 4 and the device drivers 5 is performed collectively. It is also possible to control transmission and reception of data between the devices 6 according to instructions from the application program 4. The common interface driver 7 is an interface between the device driver 5(A) and the device driver 5(B), which operates in a kernel mode 8.

More specifically, the devices 6 include a device A and a device B, which are controlled by a device driver A and a device driver B, respectively. The flow of data when it is transferred from the device A to the device B is shown in the flowchart of FIG. 2. When the application program 4 that runs in a user mode 9 needs to transfer data from the device A to the device B (S1), it sends a request (instruction) of transferring data (S2). At this time, the operating mode of the system is the user mode 9.

The operating mode of the system is switched to the kernel mode 8. The common interface driver 7 receives the data transfer request from the application program 4 (S3). The common interface driver 7 analyzes the data transfer request (S4) to give instructions to various processing sections. The common interface driver 7 sends a data transmission request to the device driver A (S5). The common interface driver 7 sends a data reception request to the device driver B (S6).

The device driver A receives the data transmission request from the common interface driver 7 (S7) and transmits it to the device A (S8). The device A receives the data transmission request (S9) and transmits data to the device driver A (S10). The device driver A receives the data (S11), internally processes it (S12) and transfers the processed data to the common interface driver 7 (S13). The common interface driver 7 receives the data and subjects it to processing, e.g. compression and encryption (S14) and then transmits the result of the processing to the device driver B (S15).

The device driver B receives the data from the common interface driver 7 (S16), internally processes it (S17) and transmits the result of the internal processing to the device B (S18). The device B receives the data (S19) and sends information indicating the receipt of the data to the device driver B (S20). The device driver B receives the data receipt information (S21) and sends information indicating the completion of the data transfer to the common interface driver 7 (S22).

The common interface driver 7 receives the data transfer completion information (S23) and informs the application program 4 of the data transfer completion information to wait for a subsequent instruction (S24). At this time, the operating mode of the system is switched from the kernel mode 8 to the user mode 9. The application program 4 receives the data transfer completion information (S25) and starts subsequent processing.

Thus, the series of data transfer operations ends (S26). As stated above, data is transferred as follows: "device A"→"device driver A"→"common interface driver 7"→"device driver B"→"device B". During the transfer of the data, the system operates in the kernel mode 8, and it is unnecessary to switch between the operating modes.

Further, data is transferred between the devices 6 directly in the kernel mode 8 without passing through the application program 4 in the user mode 9. Accordingly, it becomes possible to transfer a large amount of data at high speed. In addition, because data is transferred in the kernel mode 8, in which no data can be handled directly from the application program 4, the integrity of data is enhanced.

When the device B includes various devices such as input devices, e.g. a keyboard and a mouse, the devices have respective device drivers. These device drivers are connected to the common interface driver 7 in parallel to exchange data with each other or with the application program 4 through the common interface driver 7.

The common interface driver 7 has functions to execute various processing, including data compression, encryption and decryption. When requested from the application program 4, the common interface driver 7 performs high-speed transmission and reception of data between the devices or between the application program 4 and the device A or B by using these functions.

In addition, the common interface driver 7 has a time stamp function to indicate the time of received data, thereby being capable of putting a time stamp on data received from the devices A and B and so forth. By using the time stamp function, it is possible to accurately grasp information concerning the time of entry of data made from the devices A and B.

In particular, when data entry time is important as in the case of personal authentication using the user's data entry characteristics, even more accurate time can be grasped.

Let us consider a case where a user enters an ID and a password from a keyboard and personal authentication is performed by utilizing personal characteristics, peculiarity, etc. of the user exhibited when entering the ID and the password. In this case, information entered from the keyboard is obtained by using the common interface driver 7. The information includes information identifying which key of the keyboard has been depressed.

Further, the common interface driver 7 adds a time stamp to the information. The user's data entry characteristics can be calculated by analyzing the keyboard information, which has been subjected to the time stamp processing, when personal authentication is performed. Thus, it is possible to perform personal authentication taking into consideration the user's keyboard entry characteristics.

To calculate the user's data entry characteristics, at least one of first to fourth times as stated below can be used. The times include the following: a first time that is a time interval from when one key of the keyboard is depressed until the key is released; a second time that is a time interval from when one key of the keyboard is depressed until another key is subsequently depressed; a third time that is a time interval from when one key of the keyboard is released until another key is subsequently depressed; and a fourth time that is a time interval from when one key of the keyboard is released until another key is subsequently released.

In addition, data obtained by statistical processing utilizing the first to fourth times can be used as the user's data entry characteristics.

FIRST EMBODIMENT OF PERSONAL
AUTHENTICATION METHOD

Figure 3:
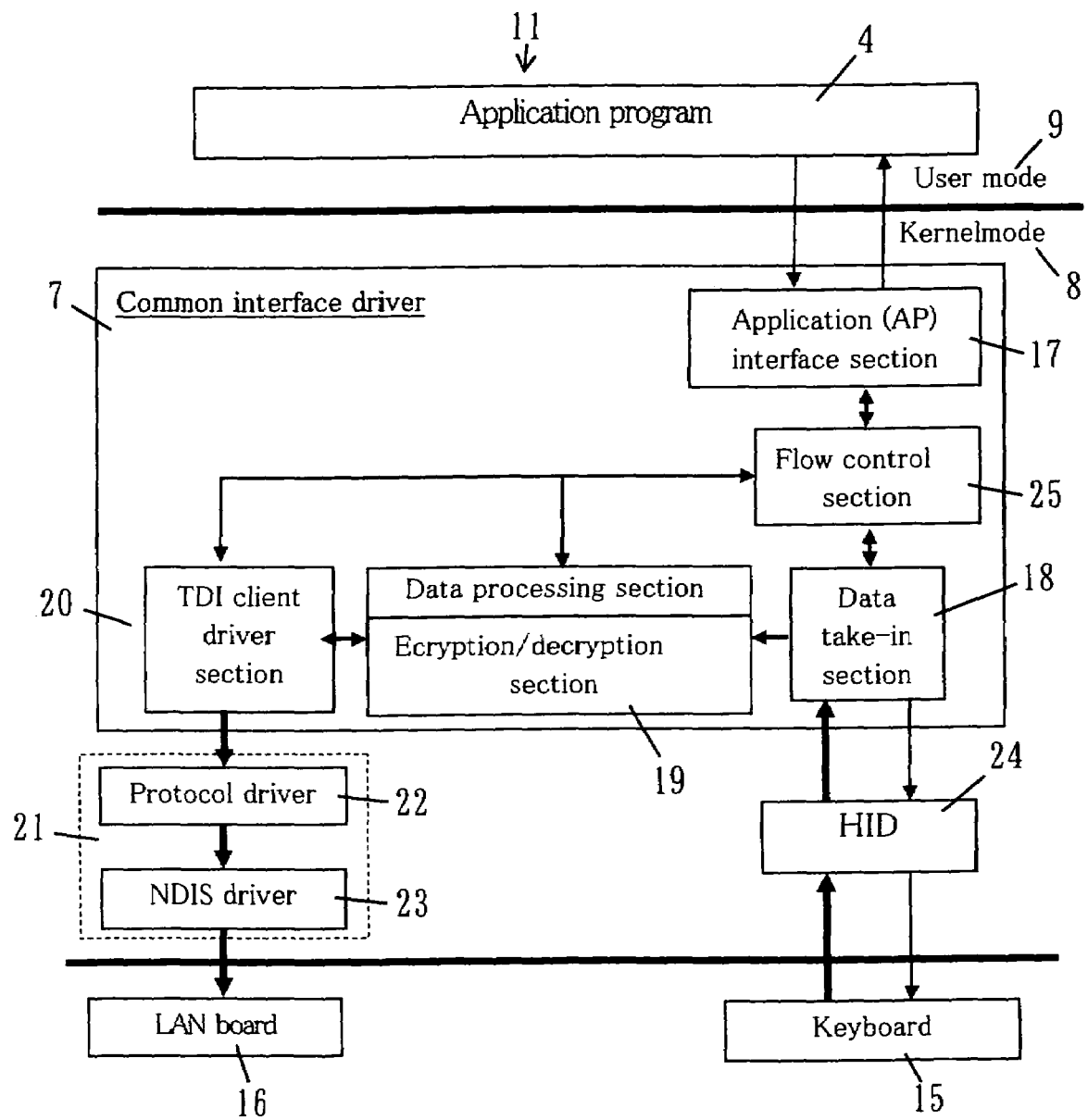
FIG. 3 is a block diagram of a common interface driver.

The following is a description of a first embodiment of the personal authentication method using the common interface driver program that runs in the kernel mode. A procedure in which personal authentication of the user is performed by entry of a password from a keyboard will be explained. FIG. 3 is a diagram showing an embodiment of the common interface driver 7. The figure particularly shows the internal configuration of the common interface driver 7 in an electronic computer 11, together with the flow of commands and data.

The user enters a password or the like by actuating keys of a keyboard 15, and personal authentication is performed by the application program 4. At this time, data is exchanged between the application program 4 and the keyboard 15 via the common interface driver 7. The common interface driver 7 comprises a data take-in section 18, a TDI client driver section 20, a data processing section (having an encryption section and a decryption section) 19, an AP interface section 17, and a flow control section 25. The outline of the function of each section is as follows.

The data take-in section 18 receives data such as device actuation data concerning the keyboard 15 from an HID 24, which is a keyboard driver, to input the received data into the common interface driver 7. The AP interface section 17 provides an interface between the application program 4 and the common interface driver 7. The AP interface section 17 receives a parameter setting command, an operation start command, etc. from the application program 4, analyzes the commands, delivers operating parameters to each processing section, and supervises data transmission/reception conditions.

The data processing section 19 processes input data received from the data take-in section 18 by subjecting the data to encryption, compression, time stamp processing, etc. The data processing section 19 receives keyboard actuation data input through the data take-in section 18, adds thereto a time stamp indicating the time of entry of the data, and transmits the time-stamped data to the application program 4 through the AP interface section 17 or to a network through the TDI client driver section 20.

The TDI client driver section 20 provides an interface between a LAN board driver 21 and the common interface driver 7. The LAN board driver 21 comprises a protocol driver 22 and an NDIS (Network Driver Interface Specification) driver 23. The LAN board driver 21 controls a LAN board 16 to establish connection and to control the protocol when data is transmitted to the network.

The protocol driver 22 controls the communication protocol when data is transferred to the network. The NDIS driver 23 provides an interface between the protocol driver 22 and the LAN board 16. The TDI client driver section 20 receives packeted data from the data processing section 19 and outputs it to the protocol driver 22.

The flow control section 25 controls the data take-in section 18 in response to a specific instruction to disable external access. The specific instruction maybe one from the application program 4 or the network. In particular, the specific instruction is used to prevent unauthorized access.

Figure 4:
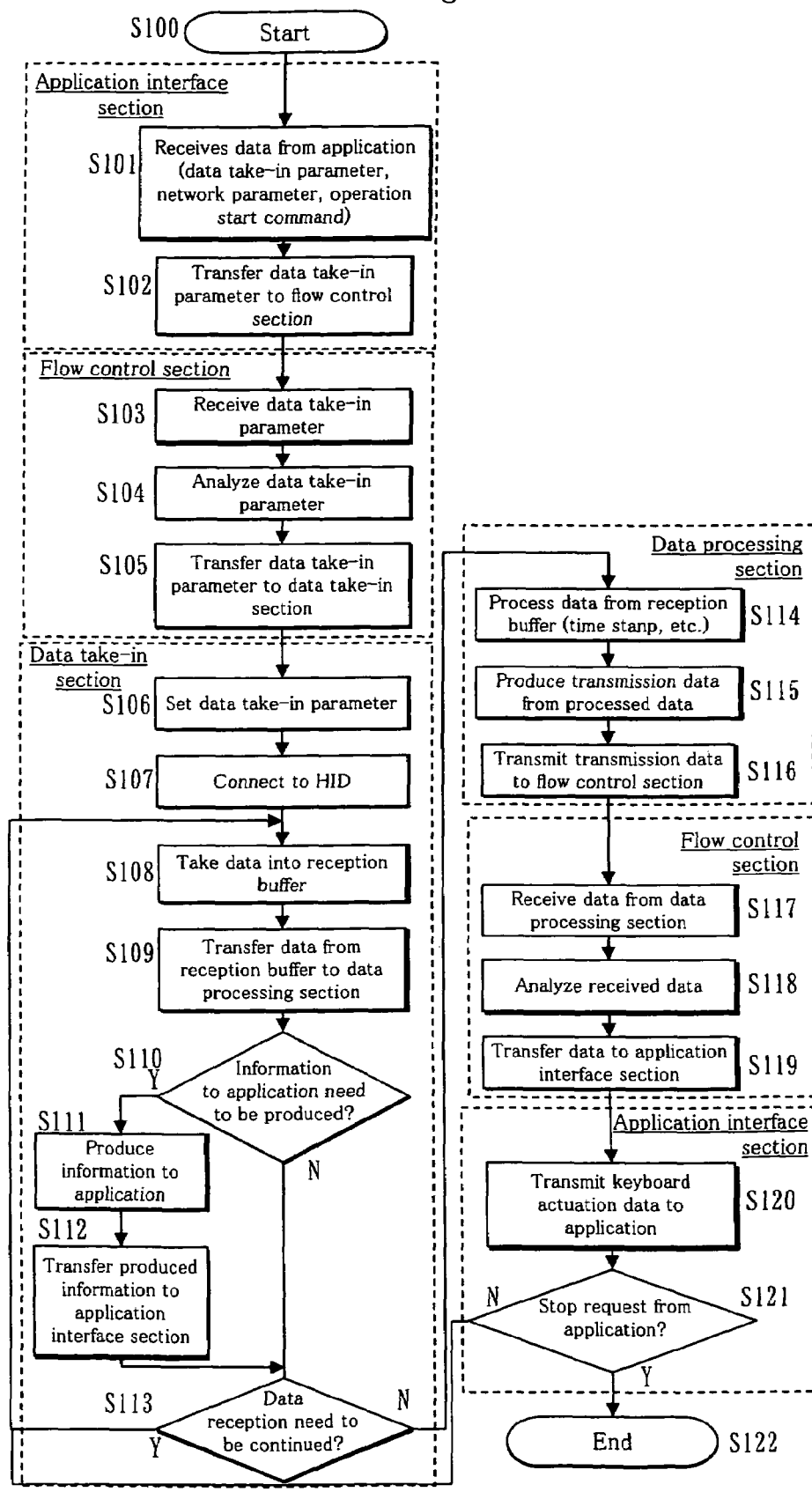
FIG. 4 is a flowchart showing the operation of the system shown in FIG. 3.

Next, a procedure in which the special-purpose application program 4 for personal authentication in the electronic computer 11 performs personal authentication by using a password entered from the keyboard 15 will be described with reference to the flowchart of FIG. 4.

The flowchart shows a procedure in which the common interface driver 7 receives data concerning a password from the keyboard 15 in response to an instruction from the application program 4 running in the user mode 9 and transmits the password data to the application program 4. First, the application program 4 outputs an instruction for transmission and reception of password data from the keyboard 15 to start data reception (S100). The output instruction is delivered to the common interface driver 7 through an interface provided according to the standard specifications of Windows.

The AP interface section 17 of the common interface driver 7 receives the instruction from the application program 4 (S101) The instruction includes a data take-in parameter and an operation start command. The AP interface section 17 transfers the data take-in parameter to the flow control section 25 (S102). The flow control section 25 receives the data take-in parameter (S103), analyzes the received parameter (S104), and transfers the analyzed parameter to the data take-in section 18 (S105).

The data take-in section 18 sets the data take-in parameter (S106) and performs connection to the HID 24 (S107). Thus, preparation for receiving data from the keyboard 15 is completed. Data from the keyboard 15 is taken into a reception buffer of the data take-in section 18 through the HID 24 (S108). The data take-in section 18 transfers the data in the reception buffer to the data processing section 19 (S109).

When requested from the AP interface section 17 (S110), the data take-in section 18 produces necessary information concerning the data receiving condition, the progress condition of data processing, etc. to send it to the application program 4 (S111). The produced information is transferred to the AP interface section 17 through the flow control section 25 (S112). When it is necessary to receive keyboard actuation data subsequently, steps S108 to S110 (or S112) are repeated to receive keyboard actuation data.

The data processing section 19 performs data processing of the received keyboard actuation data (S114). In the data processing, necessary processing is executed, such as time stamp processing that indicates the time of keyboard entry or the like, which is additional information necessary for the application program 4. The data processing also includes encryption.

Based on the data processed as stated above, transmission data to be transmitted to the application program 4 is produced (S115). At this time, when the processed data is long, for example, it is divided into packets (S116). The flow control section 25 receives the transmission data from the data processing section 19 (S117), analyzes the received data (S118), and transfers it to the AP interface section 17 (S119).

Finally, the AP interface section 17 transmits the keyboard actuation data to the application program 4 (S120), and monitors a request from the application program 4 (S121). Where there is no instruction, the data take-in operation is continuously performed (S121 ▫S108). When there is a stop instruction (S121), the instruction is given to each of the processing sections 17 to 20 and 25. Then, the processing is ended (S122).

Figure 6:
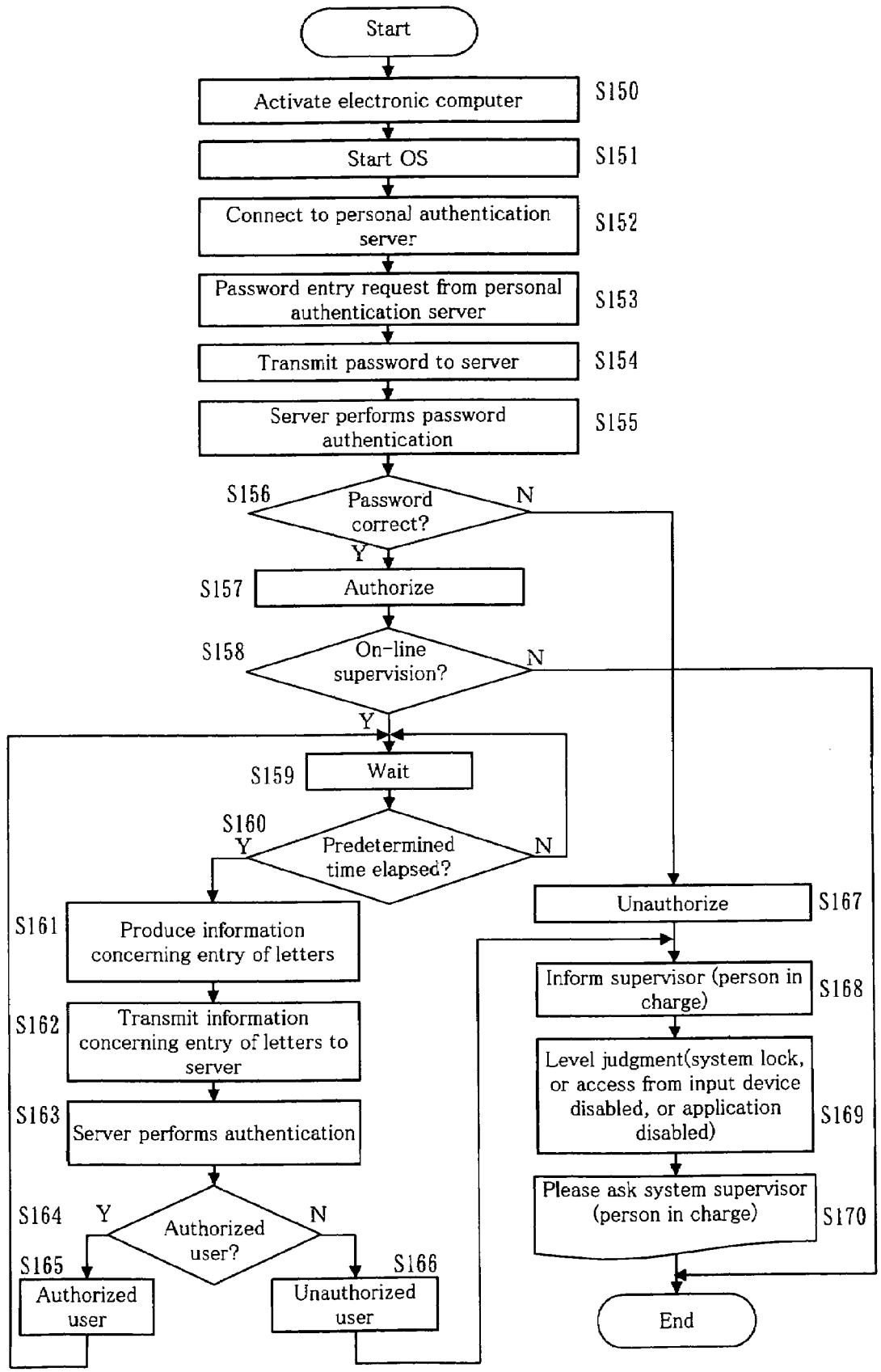
FIG. 6 is a flowchart showing the operating procedure of the system shown in FIG. 5.

FIG. 6 is a flowchart showing an operating procedure for performing personal authentication. User's personal authentication is performed by using a user ID, a password, etc. and utilizing data of entry characteristics of the user exhibited when the user enters these pieces of data from the keyboard. The data entry characteristics are obtained computationally by using information concerning the time when keys of the keyboard are depressed or released. In the common interface driver 7, a time stamp is added to information identifying a key to produce time information. Then, the time information is sent to a server. At the time of personal authentication, the server uses at least one of the following first to fourth times by computing them (S155 and S156).

The above-described times include the following: a first time that is a time interval from when one key of the keyboard is depressed until the key is released; a second time that is a time interval from when one key of the keyboard is depressed until another key is subsequently depressed; a third time that is a time interval from when one key of the keyboard is released until another key is subsequently depressed; and a fourth time that is a time interval from when one key of the keyboard is released until another key is subsequently released. Further, data obtained by statistical processing utilizing the first to fourth times can be used as the user's data of entry characteristics.

Figure 9:
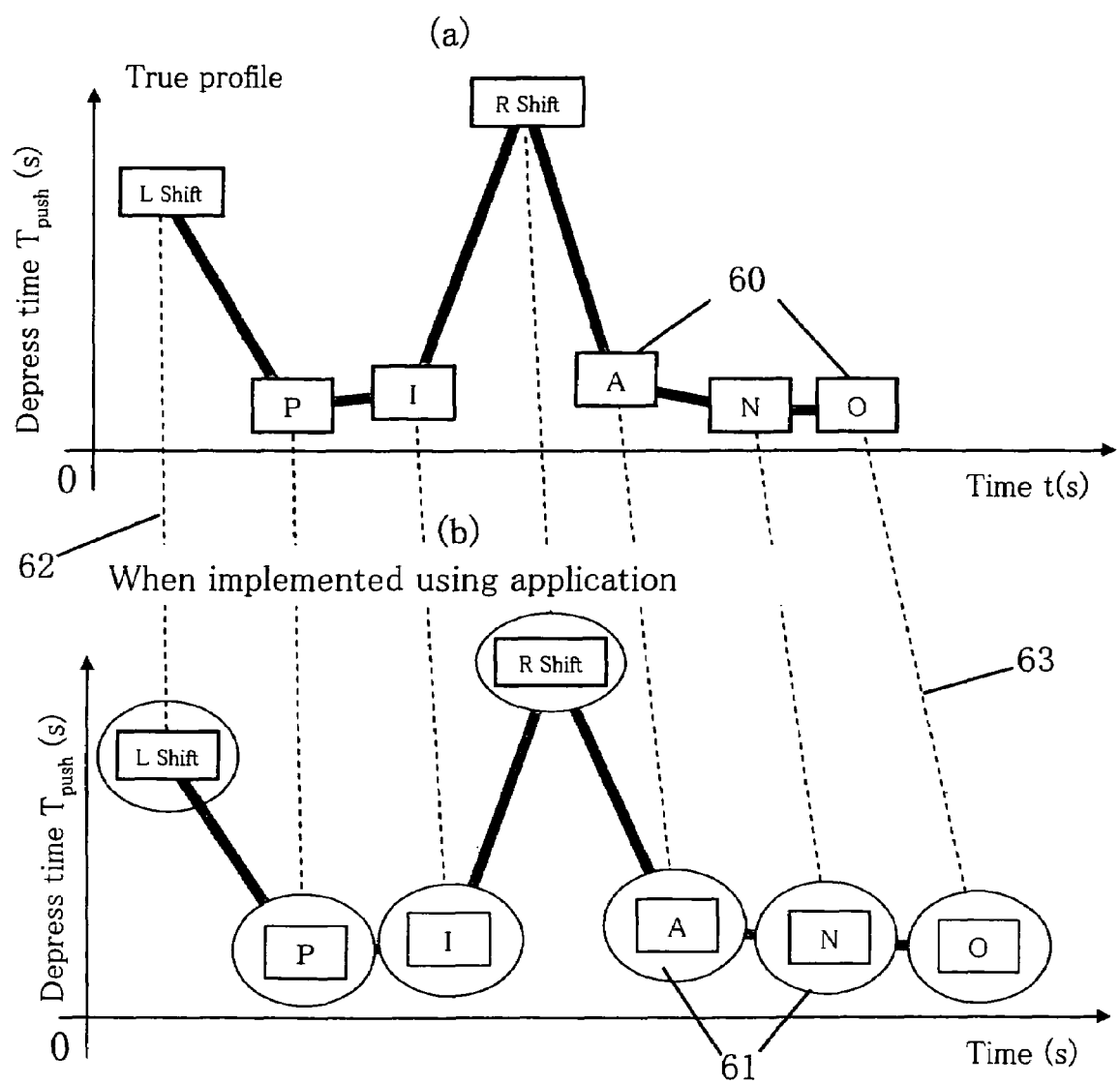
FIG. 9 is a graph showing data of personal entry characteristics in the prior art.
Figure 10:
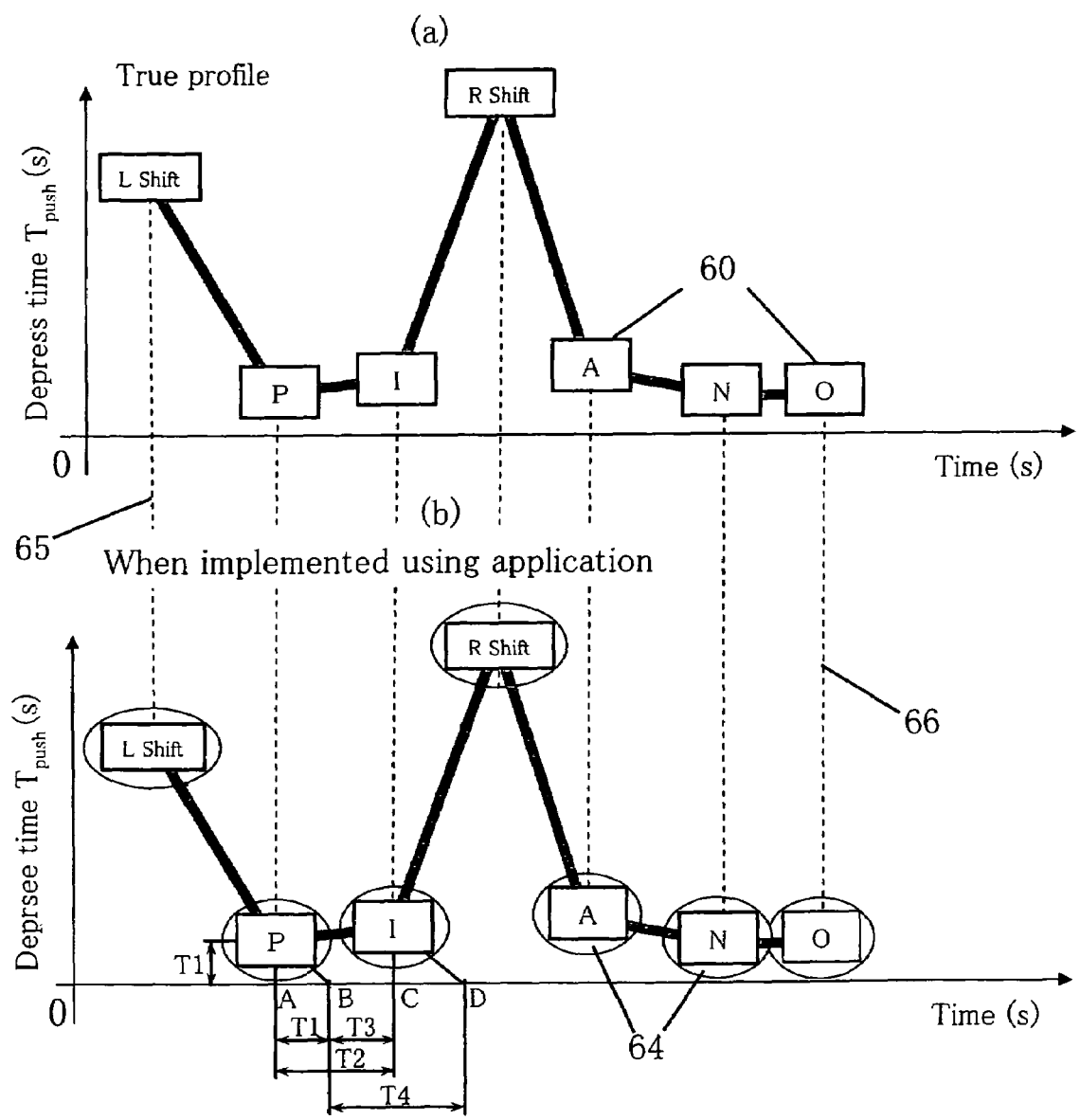
FIG. 10 is a graph showing personal data entry characteristics in the present invention.

FIG. 10 is a graph in which the time that the user depresses a key to enter a letter from a keyboard is plotted along the abscissa axis, and the length of time that the user continues to depress the key is plotted along the ordinate axis. FIG. 10 is similar to the above-described FIG. 9. The graph (a) in FIG. 10 is assumed to be a true graph showing the time when the user enters data. If time errors that may arise when an individual enters data are taken into consideration, the time that the user depresses one key can be substantially graphed in the form of a quadrangle 60.

When the common interface driver 7 is used to obtain the time that the user depresses keys, the error range of time when the user enters data becomes as shown by ellipses 64 in the graph (b) in FIG. 10. When the system is executing processing imposing a heavy load on the central processing unit and the like of the electronic computer, for example, when the system is executing another application program, a slight time lag occurs as shown by slightly tilted lines 65 and 66. It will be understood that the ellipses 64 in the graph (b) of FIG. 10 are much smaller than the ellipses 61 in the graph (b) of FIG. 9. The lines 66 also show that the time lag is smaller than in the case of the lines 63.

In the graph (b) of FIG. 10, a time at which one key is depressed is represented by point A. A time at which the key is released is represented by point B. Times at which another key is subsequently depressed and released are represented by points C and D, respectively. The above-described first time is T1=B−A, and the second time is T2=C−A. Similarly, the third time and the fourth time are T3=C−B and T4=D−B, respectively.

SECOND EMBODIMENT

Figure 5:
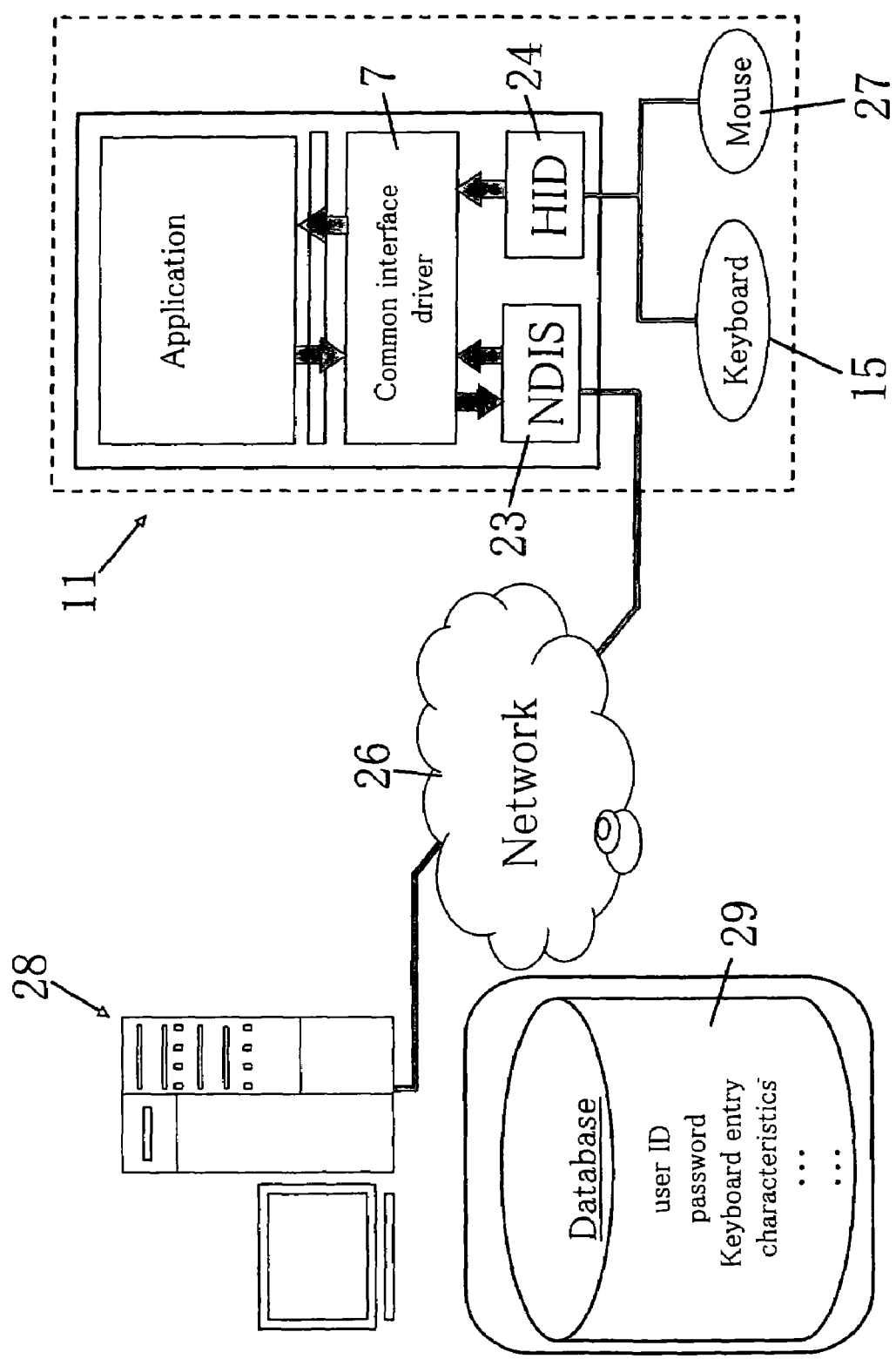
FIG. 5 is a conceptual view showing personal authentication performed via a network.

Next, an embodiment of personal authentication using a network will be shown. FIG. 5 shows the outline of a system according to the second embodiment. An electronic computer 11 that the user uses is connected to a personal authentication server 28 through a network 26. Input devices such as a keyboard 15 and a mouse 27 for the user to access the electronic computer 11 are connected to the computer 11. The electronic computer 11 has a network card (not shown) for connection to the network 26.

The network 26 may be any network for communications, e.g. a LAN or Internet. An application program for personal authentication runs on the personal authentication server 28 to control a common interface driver 7 in the electronic computer 11. For this operation, a protocol such as TCP/IP can be used. The personal authentication server 28 can identify the electronic computer 11 that the user is using by utilizing the IP address, and control the common interface driver 7 in the electronic computer 11.

The common interface driver 7 disables an unauthorized user from accessing the electronic computer 11 according to instructions from the personal authentication application program. For this purpose, the common interface driver 7 has the functions of stopping access from any input device and limiting access to a specific or all application programs from an input device or the function of locking the whole electronic computer system.

The personal authentication server 28 has a storage medium in which a database 29 prepared in advance has been stored. To identify the user operating the electronic computer 11 as an authorized user, the personal authentication application program compares information concerning the user stored in the database 29 with information sent from the electronic computer 11.

For the user authentication, at least the name of the user or a previously issued ID is needed. Moreover, a password or the like having information indicating personal data of entry characteristics is needed. As the information indicating personal data entry characteristics, time information is needed such as the length of time that the user continues to depress one key of the keyboard 15, or the length or time from when the user depresses one key until he or she depresses another key subsequently.

Next, these operations will be described with reference to a flowchart shown in FIG. 6. The electronic computer 11 is activated (S150), and an OS stored in a storage medium of the electronic computer 11 is started (S151). The electronic computer 11 is connected to the personal authentication server 28 via the network 26 according to settings preset by the network function of the OS that is provided according to standard specifications (S152).

The personal authentication server 28 identifies the newly connected electronic computer 11, and the personal authentication application program requests entry of a password or the like to perform authentication of the user (S153). The electronic computer 11 receives the request and requests the user to enter a password or the like. When the user enters a password or the like, the electronic computer 11 transmits it to the personal authentication server 28 (S154). The personal authentication server 28 receives the password or the like, and the personal authentication application program performs authentication of the user (S155).

The personal authentication application program compares the information from the electronic computer 11 with the database 29 of the personal authentication server 28 to judge whether or not the user's password or the like is correct (S156). When it is judged that the user is an authorized one, the personal authentication application program transmits permission with which the user can access the electronic computer 11 (S157).

Subsequently, the personal authentication application program performs on-line supervision of the way in which the user accesses the electronic computer 11 (S158→S159). If it is only necessary to verify the password, the authentication operation ends at this point (S158→END).

To perform on-line supervision, the personal authentication application program waits for a predetermined period of time (S159 and S160). The common interface driver 7 produces information concerning the entry of letters (S161), and transmits the information concerning the entry of letters to the personal authentication server 28 (S162). Upon receipt of the information concerning the entry of letters sent from the electronic computer 11, the personal authentication server 28 performs personal authentication (S163). Thus, the personal authentication server 28 judges whether or not an authorized user is using the electronic computer 11 (S164).

If it is judged that an authorized user is using the electronic computer 11, the personal authentication application program waits subsequently for a predetermined period of time until next authentication (S165→S159). If it is judged that unauthorized access has been made (S166), the supervisor (person in charge) is informed of this fact (S168). If there is an error in the password or the like during the verification thereof at step S156, access to the electronic computer 11 is unauthorized (S167), and the supervisor (person in charge) is informed of this fact (S168).

Then, the level for accessing the electronic computer 11 is judged from the initial settings or the like, and the user of the electronic computer 11 is disabled (S169). The level indicates a state where the use of the electronic computer 11 is disabled owing to an error in the password, such as a system lock state in which any access to the electronic computer 11 is disabled, or an entry disable state where access from any input device is disabled, or a state where entry of data is disabled while the running application program is allowed to run continuously.

Finally, the person accessing the electronic computer 11 is informed that access to the computer 11 has been disabled. With this processing, the series of authentication operations ends. Thus, all the conditions of accessing the electronic computer 11 can be controlled by controlling the device driver from the common interface driver 7. Therefore, at S169, the electronic computer 11 can be brought into a state such as the system lock state or the entry disable state. The flow control section 25 (described later) has these control functions and thus produces the above-described state to control the system.

It is possible to perform flexible control when the electronic computer 11 has been brought into a state such as that stated above. For example, the electronic computer 11 is returned to the password authentication state after a predetermined period of time has elapsed. Alternatively, the electronic computer 11 is returned to the previous state upon receiving permission from the supervisor (person in charge). It is also possible to bring the electronic computer 11 into a state where it cannot be reset unless the power to the electronic computer 11 is turned off and then it is activated again.

The above-described control is merely an example, and it is not always necessary to perform control similar to that of the second embodiment. The present invention can be carried out in any form as far as the above-described functions are available. Further, the present invention is not necessarily limited to such input devices as the mouse 27 and the keyboard 15. A network card and other peripheral devices can be similarly handled.

User personal authentication can also be performed by a method using a user ID, a password or the like and further utilizing data of entry characteristics of the user exhibited when the user enters these pieces of data from the keyboard. The data of entry characteristics are obtained computationally by using information concerning the time when keys of the keyboard are depressed or released.

In the common interface driver 7, a time stamp is added to information identifying a key to produce time information. Then, the time information is sent to the personal authentication server 28. At the time of personal authentication, the personal authentication server 28 uses at least one of the following first to fourth times by computing them (S155 and S156).

The times include the following: a first time that is a time interval from when one key of the keyboard 15 is depressed until the key is released; a second time that is a time interval from when one key of the keyboard 15 is depressed until another key is subsequently depressed; a third time that is a time interval from when one key of the keyboard 15 is released until another key is subsequently depressed; and a fourth time that is a time interval from when one key of the keyboard 15 is released until another key is subsequently released. The first to fourth times are obtained in the same way as in the case of calculation of the above-described T1 to T4.

Further, data obtained by statistical processing of utilizing the first to fourth times can be used as the user's data entry characteristics. When on-line supervision is performed also, judgment is made (at S163 and S164) by using at least one of the above-described first to fourth times or data obtained by statistical processing of utilizing the first to fourth times.

Figure 7:
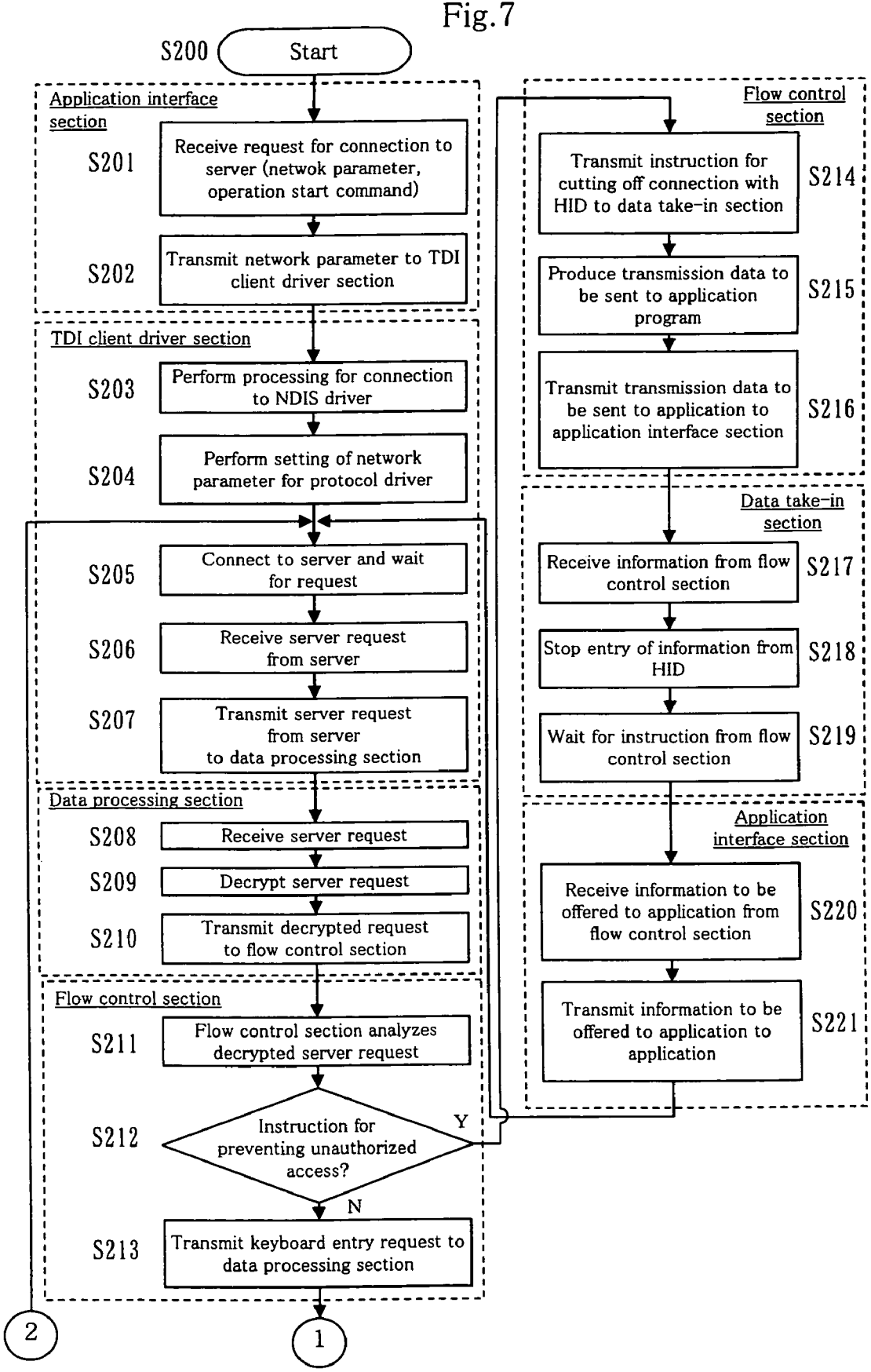
FIG. 7 is a flowchart (1) showing the operating procedure of the common interface driver when personal authentication is performed via the network.
Figure 8:
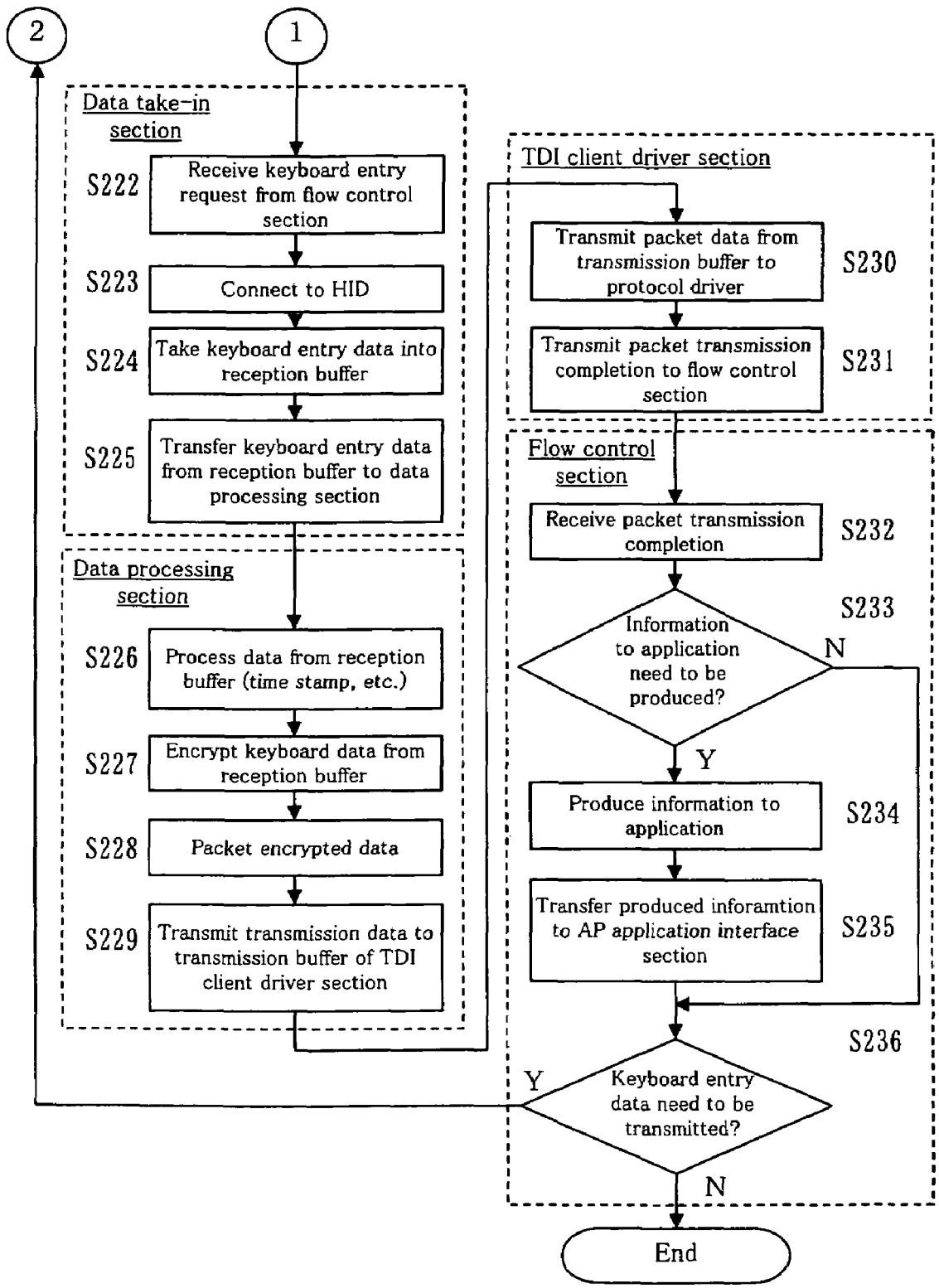
FIG. 8 is a flowchart (2) continued from the flowchart (1) of FIG. 7.

Next, the operation of the common interface driver 7 showing the second embodiment will be described with reference to flowcharts shown in FIGS. 7 and 8. The arrangement of the common interface driver 7 is the same as that of the first embodiment shown in FIG. 3. The function of each section is also similar to that in the first embodiment. Here, a description will be given by using the functions described above in connection with the foregoing embodiment, together with functions added thereto.

The electronic computer 11 is activated, and the OS is started. Consequently, the electronic computer 11 is connected to the personal authentication server 28 on the network 26 according to the initial settings of the OS or in response to a request from a special-purpose application program, and personal authentication is requested through the network 26. The personal authentication request is received by the AP interface section 17 of the common interface driver 7 through an interface provided by the OS (S201).

The request for connection to the personal authentication server 28 includes various parameters necessary for connection to the network 26 and an operation start command. The AP interface section 17 transfers the various network parameters to the TDI client driver section 20 through the flow control section 25 (S202). The TDI client driver section 20 executes processing for connection to the NDIS driver 23 (S203), and performs setting of network parameters for the protocol driver 22 (S204).

Accordingly, the LAN board driver 21 transmits a request for connection to the personal authentication server 28, whereby the electronic computer 11 is connected to the personal authentication server 28, which is connected to the network 26, and the TDI client driver section 20 waits for a request from the personal authentication server 28 (S205). Then, the TDI client driver section 20 receives a request from the personal authentication server 28 (S206). That is, the TDI client driver section 20 receives a server request sent from the personal authentication server 28 and transfers it to the data processing section 19 (S206 and S207). The data processing section 19 receives the server request (S208) decrypts the server request (S209), and transmits it to the flow control section 25 (S210).

The flow control section 25 receives the request and analyzes it (S211). That is, the flow control section 25 analyzes the server request to find the purpose thereof, i.e. whether it is data to be sent to the application program 4 or a request for personal authentication. The flow control section 25 also analyzes the server request to determine whether or not it is a command for preventing unauthorized access made externally. When the server request demands access information from the keyboard 15 for personal authentication, the flow control section 25 instructs each section to return information entered from the keyboard 15 to the server (S212 and S213).

The data take-in section 18 receives the instruction from the flow control section 25 (S222) and makes connection to the HID 24 (S223). Then, the data take-in section 18 takes data entered from the keyboard 15 into the reception buffer (S224), and transfers the keyboard entry data in the reception buffer to the data processing section 19 (S225). The data processing section 19 receives the data from the reception buffer, executes processing such as time stamp processing for adding reception time information to the received data (S226), and executes encryption processing (S227).

Then, the data processing section 19 produces packet data that is easy to transmit to the network 26, thus preparing transmission data (S228). The transmission data is transmitted to the transmission buffer of the TDI client driver section 20 (S229). The TDI client driver section 20 transmits the transmission data from the transmission buffer to the protocol driver 22, and informs the flow control section 25 of the completion of the transmission to the personal authentication server 28 (S230 and S231).

The flow control section 25 receives the packet transmission completion information (S232). When it is necessary to provide information to the application program 4, etc., the flow control section 25 produces the necessary information and transfers it to the AP interface section 17 (S233 to S235). When it is unnecessary to transmit data entered from the keyboard 15, the series of operations ends at this point, and the system waits for a next instruction from the personal authentication server 28 (S236→S205).

Thus, an instruction from the personal authentication server 28 is received through the TDI client driver section 20 (S205→S207), decrypted in the data processing section 19 (S208→S210) and analyzed in the flow control section 25 (S211→S213). If the personal authentication server 28 judges that the information entered from the keyboard 15 shows unauthorized access, that is, the user is not an authorized one, the flow control section 25 transmits an instruction for coping with this situation to each section (S214).

If necessary, the application program 4 is informed of the above-described fact through the AP interface section 17 (S215, S216, S220 and S221). When it receives the instruction from the flow control section 25 (S217) the data take-in section 18 temporarily stops the entry of information from the HID 24 and waits for a next instruction from the flow control section 25 (S218 and S219).

After the completion of the series of operations for coping with the unauthorized access, the common interface driver 7 waits until it receives a request from the system again or a correction instruction from the personal authentication server 28. In this case, it is possible to instantaneously cope with a situation where another person impersonates the user or tries to access the electronic computer 11 with the user's password.

THIRD EMBODIMENT

Next, a third embodiment of on-line supervision will be described. The system configuration of this embodiment is the same as that of the second embodiment shown in FIG. 5. The following is a description of only portions of the arrangement and operations in the third embodiment that are different from those in the second embodiment.

The third embodiment is a system for supervising whether or not a user accessing the electronic computer is an authorized one. The user can access the electronic computer and continue to perform an operation without the need to log in. However, the electronic computer 11 is supervised from the personal authentication server 28 via the network 26.

The personal authentication server 28 has a program for supervision and a database 29 and supervises whether or not a user accessing the electronic computer 11 is an authorized one. The supervising operation is carried out at steps S158 to S170 in the flowchart of FIG. 6 in the same way as in the above-described second embodiment. In the second embodiment, the supervising operation ends at step S170.

However, the supervising operation does not always need to end at step S170. It is possible to limit access from the electronic computer 11 for a predetermined period of time or to limit the application program 4 accessible from the electronic computer 11 for a predetermined period of time. After a predetermined period of time has elapsed, the supervising activity is resumed from step S158.

FOURTH EMBODIMENT

As shown in the foregoing embodiments, the use of the common interface driver 7 to perform password authentication allows direct handling of keyboard actuation information entered from the keyboard 15. Accordingly, it is possible to perform password authentication by using function keys such as "Back-Space", "Left-Shift", and "Right-Shift".

For example, if a password is entered by actuating keys in the order of "PIANO", "Back-Space" (hereinafter referred to as "BS"), "BS" and "NO", the result of the key entry appears to be "PIANO". Conventionally, the key entry made in the order of "PIANO", "BS, BS" and "NO" and the key entry made by entering "PIANO" directly have been handled equally. This is because function keys such as "BS" have heretofore been merely used to correct errors in data entry, but not handled for password authentication or the like.

If functions keys are used for password authentication, because the history of data entry made in the order of "PIANO", "BS, BS" and "NO" differs from the history of data entry made by entering "PIANO" directly, the data entered by using function keys can be used as a password. If this technique is combined with personal data entry characteristics, it is possible to perform powerful personal authentication.

FIFTH EMBODIMENT

Next, a fifth embodiment using a special-purpose encryption/decryption card 31 will be described with reference to FIG. 11. In the fifth embodiment, encryption and decryption processing in the electronic computer 11 is carried out by a special-purpose encryption/decryption card 31. The constituent sections of the common interface driver 7 in the electronic computer 11 and processing executed thereby are similar to those in the above-described first to fourth embodiments. Therefore, a description of the contents of the processing is omitted. It should be noted, however, that the arrangement of the data processing section 19 and the processing for encryption and decryption are different from those in the foregoing embodiments because the fifth embodiment uses the special-purpose encryption/decryption card 31.

Figure 11:
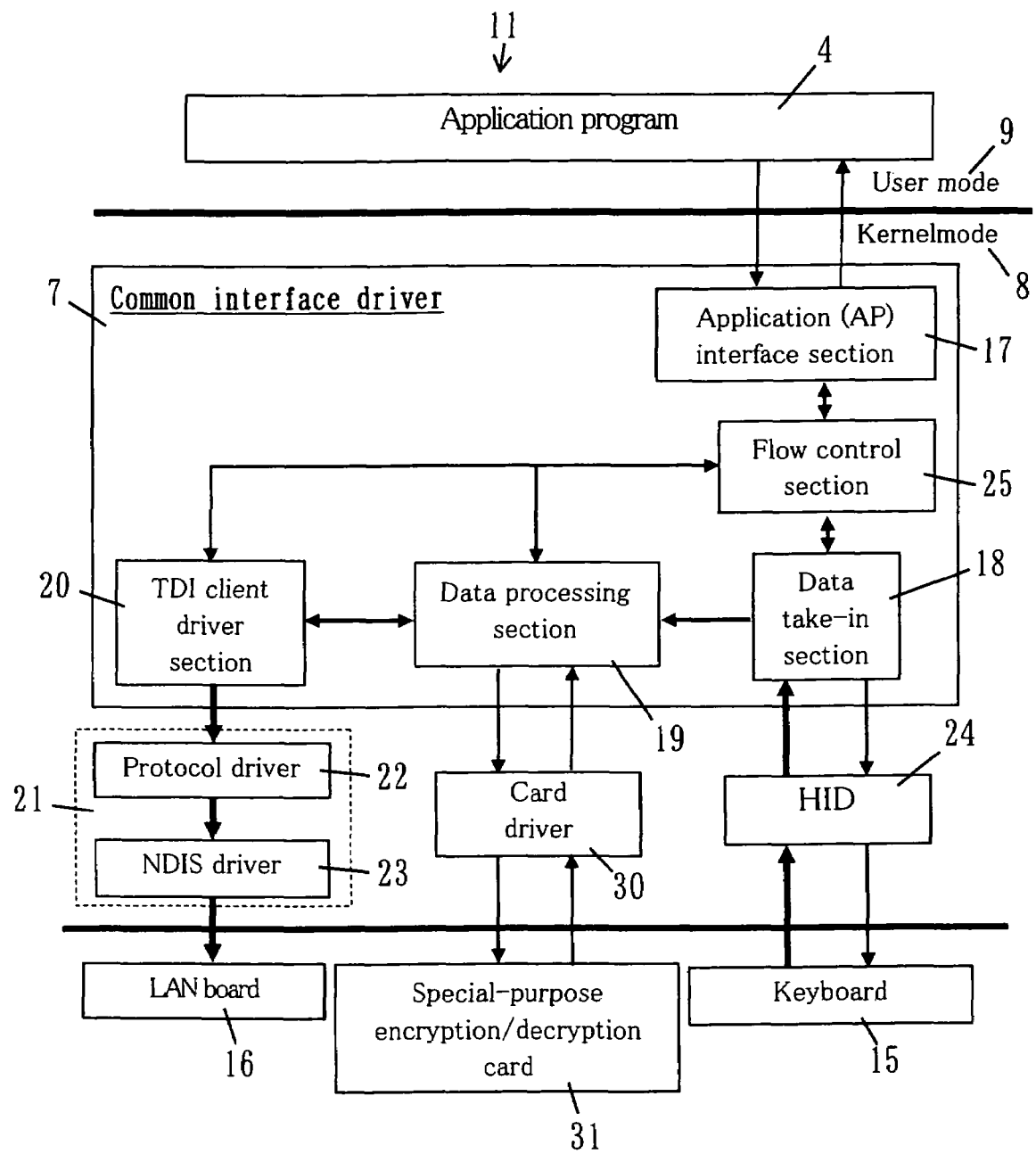
FIG. 11 is a functional block diagram of a common interface driver using a special-purpose encryption/decryption card.
Figure 12:
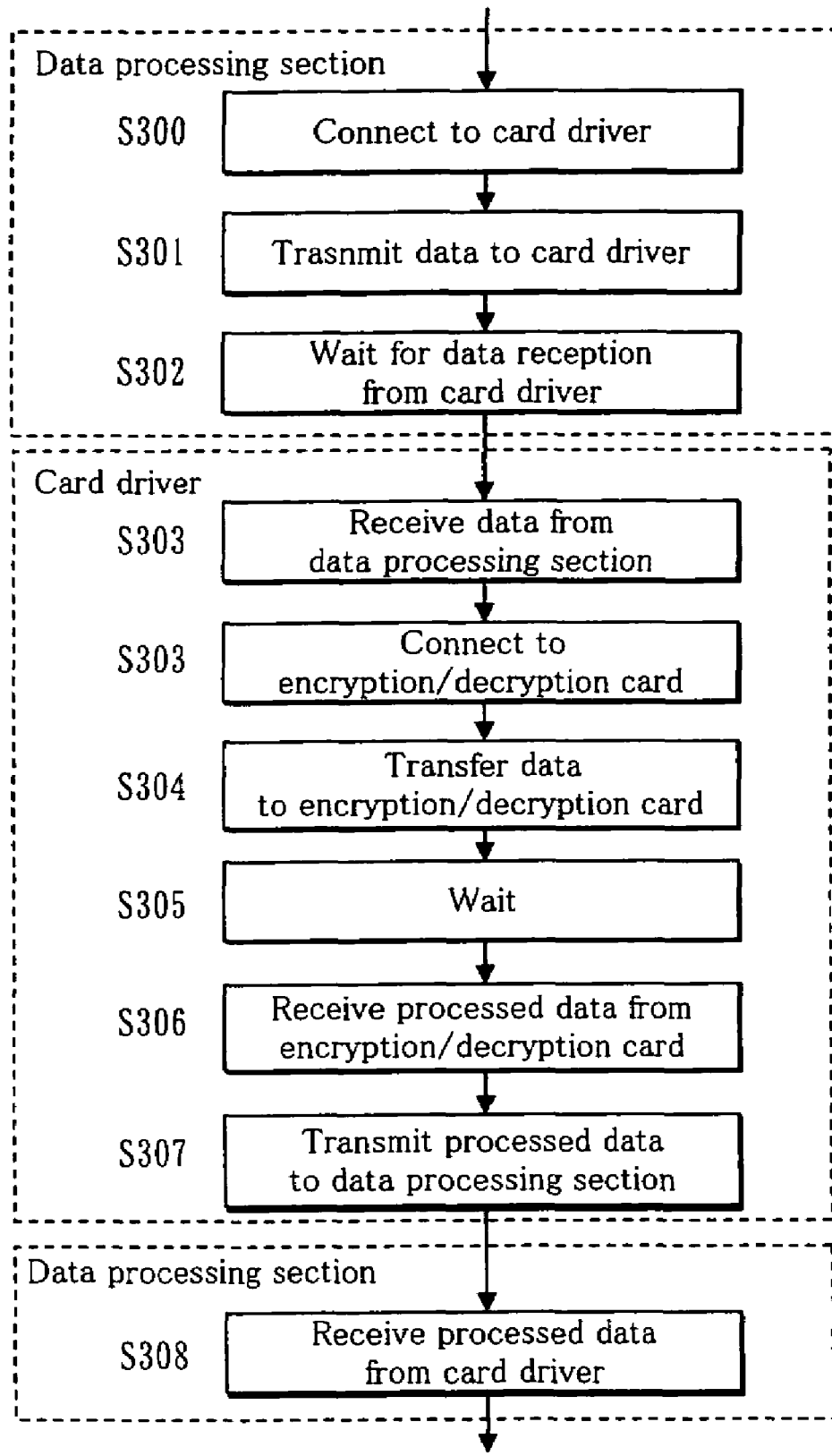
FIG. 12 is a flowchart showing the operation of the system shown in FIG. 11.
Figure 13:
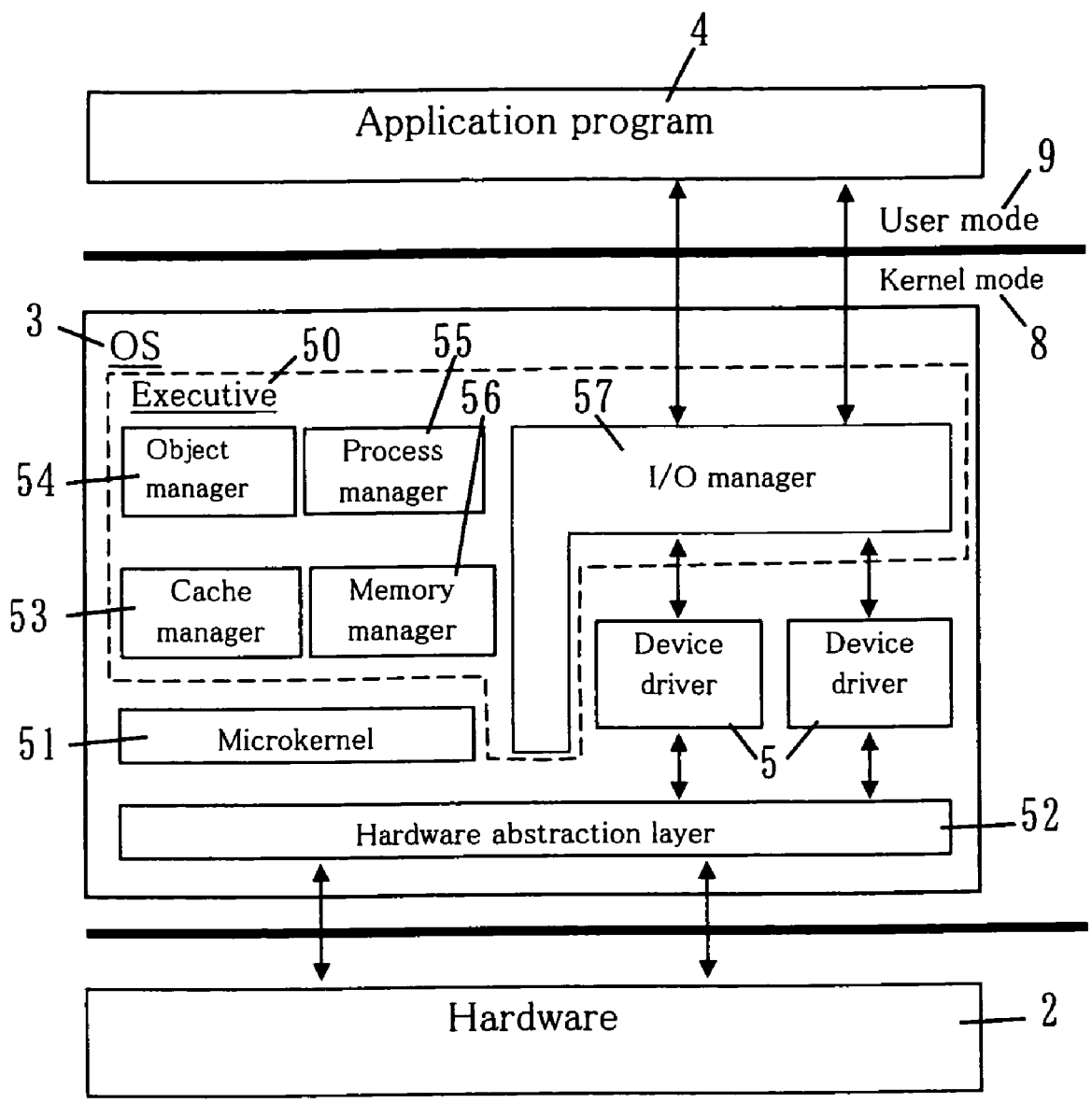
FIG. 13 is a diagram showing the architecture of Windows.
Figure 14:
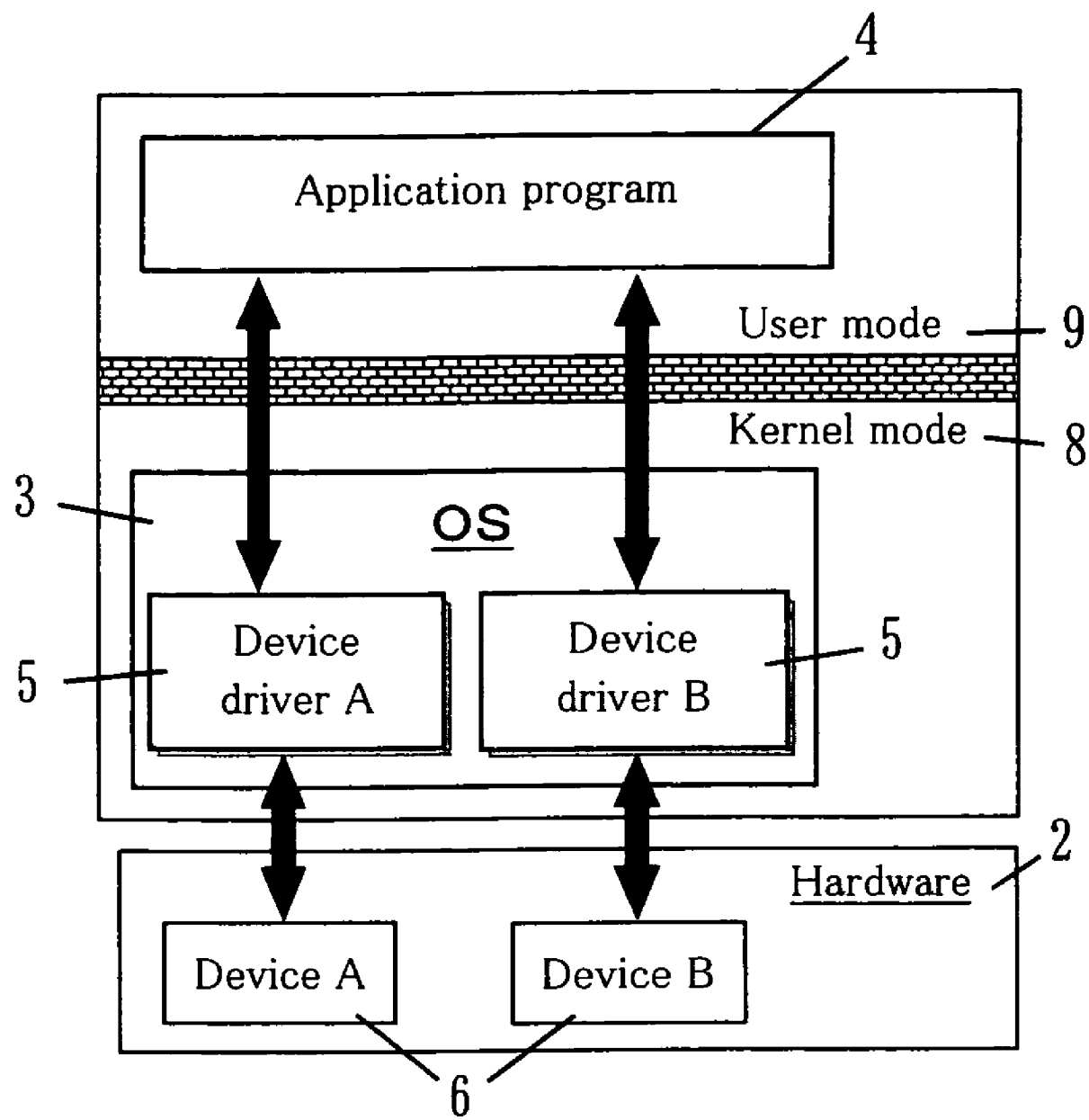
FIG. 14 is a conceptual view of the conventional OS and device drivers.
Figure 15:
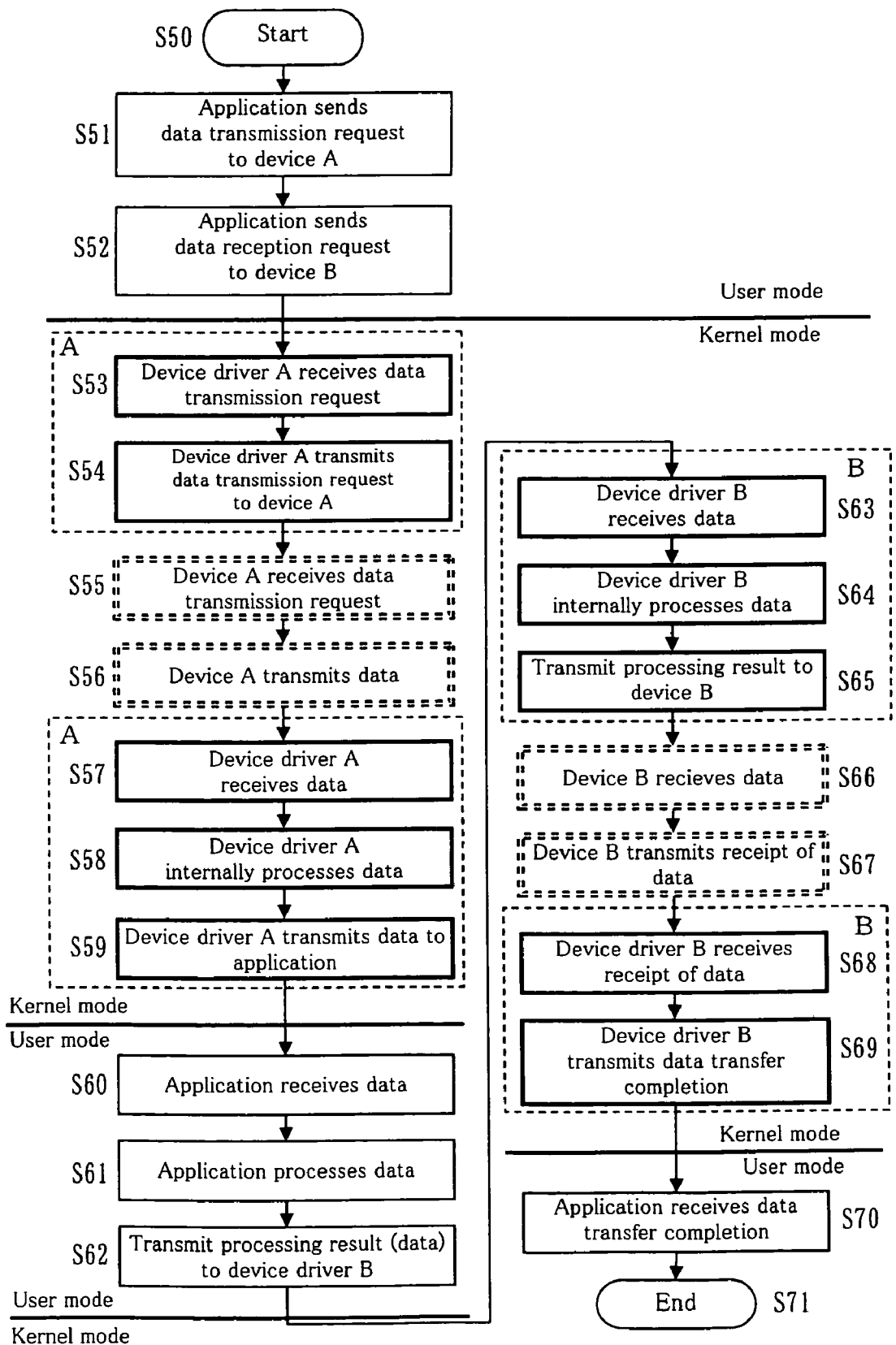
FIG. 15 is a flowchart showing the operating procedure of the conventional device drivers.
Figure 16:
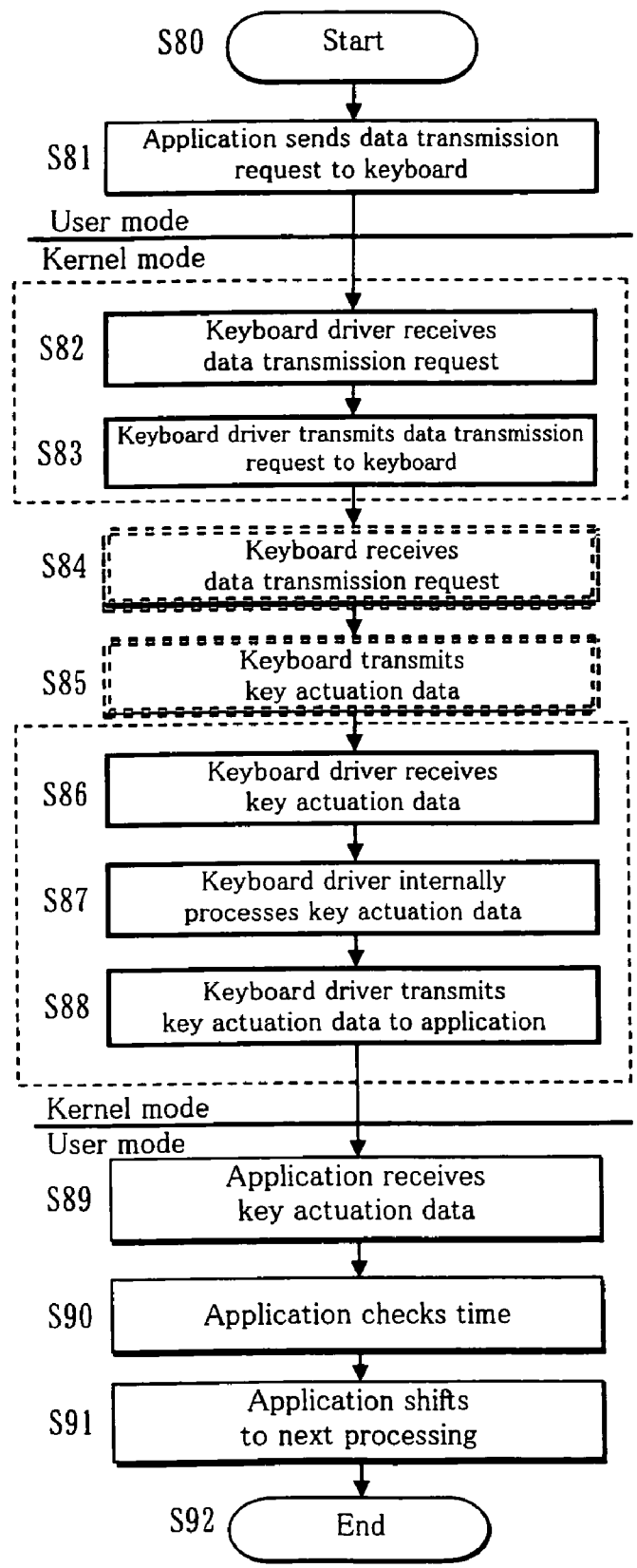
FIG. 16 is a flowchart showing the conventional process for obtaining key actuation data.

As shown in FIG. 11, the special-purpose encryption/decryption card 31, which exchanges data under the control of a card driver 30, is a piece of hardware attached to the electronic computer. The card driver 30 performs transmission and reception of data to and from the data processing section 19 of the common interface driver 7. That is, the data processing section 19 is arranged to transmit only data to be encrypted or decrypted to the card driver 30 and to receive the processed data. The operating procedure will be described below with reference to the flowchart of FIG. 12.

When data is to be subjected to encryption or decryption processing, the data processing section 19 executes processing for connection to the card driver 30 (S300). Then, the data processing section 19 transmits data to be encrypted or decrypted to the card driver 30 (S301), and waits to receive the processed data (S302).

The card driver 30 receives the data (S303), and executes processing for connection to the special-purpose encryption/decryption card 31. Then, the card driver 30 transfers the data to the special-purpose encryption/decryption card 31 (S304), and waits to receive the processed data (S305). The special-purpose encryption/decryption card 31 encrypts or decrypts the data and returns the processed data to the card driver 30.

The card driver 30 receives the processed data returned from the special-purpose encryption/decryption card 31 and transmits it to the data processing section 19 (S306 and S307). The data processing section 19 receives the processed data and starts next processing.

The fifth embodiment is merely an example. It should be noted that the access to the special-purpose encryption/decryption card 31 from the common interface driver 7 can be made freely through the data take-in section 18 or the like. Further, although the flowchart showing the operating procedure handles only one piece of data, it can be changed to a procedure suitable for continuously encrypting or decrypting a series of pieces of data or data suitable for on-line supervision.

SIXTH EMBODIMENT

Figure 17:
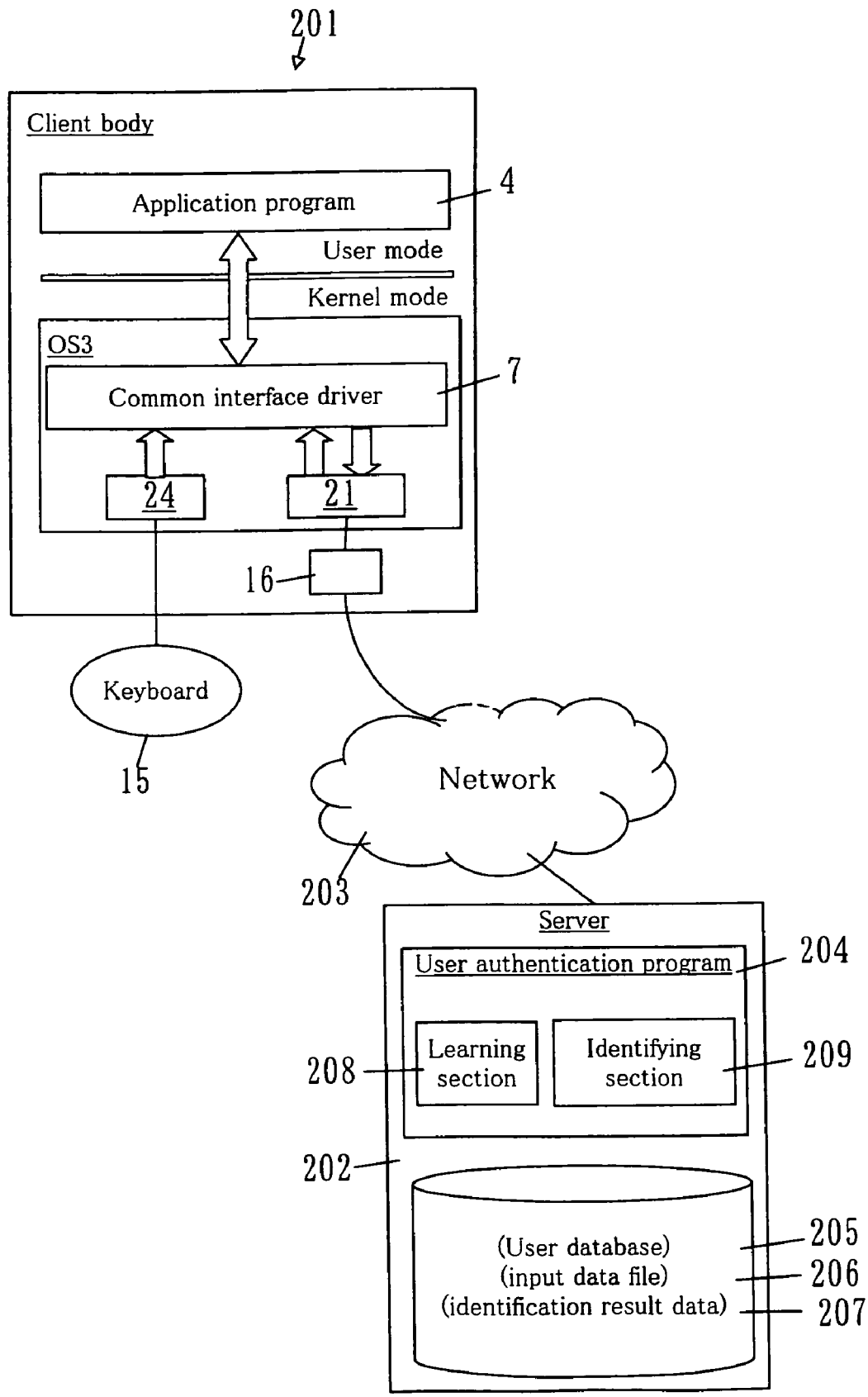
FIG. 17 is a diagram showing schematically a sixth embodiment of the present invention.

FIG. 17 shows the outline of the sixth embodiment. The personal authentication system in the sixth embodiment comprises at least a client 201 and a server 202. The client 201 and the server 202 are connected to each other through a network 203 to perform transmission and reception of data. The network 203 may be any wired or wireless network, e.g. LAN or Internet, which allows the client 201 and the server 202 to perform transmission and reception of data.

The client 201 is an electronic computer having at least a keyboard 15 and a LAN board 16. The client 201 has a common interface driver 7 installed therein. The common interface driver 7 has functions similar to those of the common interface driver 7 in the first to fifth embodiments. Therefore, the common interface driver 7 will not be herein described in detail. The common interface driver 7 has the function of obtaining data that the user enters from the keyboard 15 and transmitting the data to the server 202. More specifically, the common interface driver 7 obtains input data including data for identification of a key that the user has depressed or released and time data concerning the depression or release of the key, and transmits the input data to the server 202.

The server 202 has a user authentication program 204 installed therein. The server 202 has a user database 205 comprising data indicating data of entry characteristics of users exhibited when they enter data from the keyboard 15. The user authentication program 204 receives input data transmitted from the client 201 and analyzes the input data while comparing it with the data in the user database 205 to identify the user.

[Outline of LVQ]

The user authentication program 204 analyzes the input data by using a neural network technique. For example, the user authentication program 204 uses a learning vector quantization algorithm (hereinafter abbreviated as "LVQ"). The LVQ is a technique developed by T. Kohonen. There are a plurality of versions LVQ1 to LVQ3.

In the sixth embodiment, LVQ1 is used. Other LVQ algorithms and neural network algorithms are also usable. LVQ is a publicly known technique detailed, for example, in T. Kohonen "Self-Organizing Maps" (Springer Series in Information Sciences, 30, 2000; Springer Verlag). Therefore, a detailed description of LVQ is omitted herein.

The LVQ method is as follows. Sample data (hereinafter referred to as "teacher data") given in the initial state is divided into classes characterized by a plurality of feature vectors to quantize the teacher data, and the distance between an input vector and each feature vector is calculated. A feature vector at the closest distance to the input vector is determined, and the class to which the closest feature vector belongs is judged to be a class to which the input vector belongs.

The LVQ1 is expressed by the following equation, and learning is performed as follows. A plurality of feature vectors that characterize classes have been given in the initial state. Distances between input teacher data and all the feature vectors are calculated. Thus, the class to which the feature vector at the closest distance to the teacher data belongs can be estimated as the class to which the teacher data belongs.

A specified number of feature vectors are produced for each class and initialized by using a random number to start learning. The value of the random number is between the maximum and minimum values of vector data in each class. The feature vectors are updated to perform learning according to the following equation 1. The learning is performed a predetermined number of times to obtain an optimal feature vector with respect to the teacher data.

In the equation 1, $m_i$ and $m_j$ denote a feature vector at the closest distance to teacher data x. $m_i$ is the feature vector when it belongs to a class different from that of the teacher data x, and $m_j$ is the feature vector when it belongs to the same class as that of the teacher data x. $\sigma(t)$ is a coefficient that assumes a value of from 0 to 1.

$$m_i(t+1) = m_i(t) - \sigma(t)[x(t) - m_i(t)]$$

$$m_j(t+1) = m_j(t) + \sigma(t)[x(t) - m_j(t)]$$

$$m_k(t+1) = m_k(t) \text{ for } k \neq i, j \quad \text{(Eq. 1)}$$

[Personal Characteristics]

In the sixth embodiment, data entry characteristics of a user are expressed by using a time at which the user depresses one key and a time at which he or she releases the key. That is, the depress time at which the user depresses a key and the release time at which he or she releases the depressed key are used. Data entry characteristics of a user can be determined by the interrelation between a key that the user types and keys typed before and after the key.

FIG. 18 illustrates an example of the user's data entry characteristics determined by the interrelation between keys typed by the user. Kinds of time as stated below are used as data showing data entry characteristics of a user. The abscissa axis in the figure is a time base. The downward large arrows each show the time of the operation of depressing a key. Similarly, the upward large arrows each show the time of the operation of releasing the key. Each combination of downward and upward large arrows shows a typing operation in which the user depresses and releases one key. When the user enters data from the keyboard 15, the common interface driver 7 obtains a key code for identifying each key typed by the user, the time of depressing the key and the time of releasing the key, and transmits these pieces of data to the server 202 as input data.

Graph (a) in FIG. 18 shows an example in which the user types keys 1 to 3 successively. In the graph, t1, t2 and t3 show the temporal interrelation between the key 1 and the key 2. That is, t1 is a time interval from the time of depressing the key 1 to the time of depressing the key 2, and t2 is a time interval from the time of releasing the key 1 to the time of depressing the key 2. Further, t3 is a time interval from the time of releasing the key 1 to the time of releasing the key 2.

In the graph, t1', t2' and t3' show the interrelation in time between the key 2 and the key 3 in the same way as in the case of t1, t2 and t3. The time intervals t2 and t2' can assume minus values according to the interrelation between the time of releasing the key 1 and the time of depressing the key 2 or the interrelation between the time of releasing the key 2 and the time of depressing the key 3.

Graph (b) in FIG. 18 shows another example in which the user types the keys 1 to 3 successively. In the graph, t4, t5, t4', t5' and t4" show the temporal interrelation among the keys 1 to 3. That is, t4 is a time interval from the time of depressing the key 1 to the time of releasing the key 1, and t5 is a time interval from the time of releasing the key 1 to the time of depressing the key 2. Further, t4' is a time interval from the time of depressing the key 2 to the time of releasing the key 2, and t5' is a time interval from the time of releasing the key 2 to the time of depressing the key 3. Furthermore, t4" is a time interval from the time of depressing the key 3 to the time of releasing the key 3.

The time intervals t5 and t5' can assume minus values according to the interrelation between the time of releasing the key 1 and the time of depressing the key 2 or the interrelation between the time of releasing the key 2 and the time of depressing the key 3.

[Processing in Client]

In the sixth embodiment, the client 201 obtains input data at the time of the user's entering data from the keyboard 15 and transmits the input data to the server 202. In the client 201, data concerning keys is obtained by the common interface driver 7 running in the kernel mode. The operation of the common interface driver 7 has already been described in detail in connection with the foregoing first to fifth embodiments. Therefore, a description thereof is omitted herein.

FIG. 19 illustrates an example of input data obtained by the common interface driver 7 and transmitted to the server 202. The input data comprises the following sections: "Number" 210; "Time" 211; "IP" 212, "Key Code" 213; and "Depress/Release" 214. "Number" 210 is the ordinal number of key data obtained. "Time" 211 is the time at which key data is obtained. "Time" 211 is expressed in units of 100 nanoseconds of real time.

"IP" 212 is an address on the network for identifying the client 201. "Key Code" 213 is the code number of each key. "Key Code" 213 may be a key code specified by a country or an international organization. Alternatively, "Key Code" 213 may be a physical code number of a keyboard. "Depress/Release" 214 indicates whether a key has been depressed or released. In this section, "1" corresponds to depression, and "0" corresponds to release.

The common interface driver 7 obtains key data through the data take-in section 18 and produces input data by adding time data to the key data in the data processing section 19 (see FIG. 3). The input data thus produced is transmitted to the server 202 by the TDI client driver section 20 through the LAN board driver 21.

[Processing in Server]

The server 202 receives the input data transmitted from the client 201 and stores it as an input data file 206 in a storage medium, e.g. a hard disk or a memory. In the server 202, data entered by specific users have been obtained in advance to produce a user database 205. The user authentication program 204 compares the data in the input data file 206 with the data in the user database 205 to perform authentication of the user.

The user authentication program 204 comprises a learning section 208 and an identifying section 209. The learning section 208 is a program for producing feature vectors from the user database 205. The identifying section 209 is a program for identifying the user by comparing the input data with the feature vectors. The function of each section will be shown below in detail.

[Learning Section 208]

In the learning section 208, teacher data is read to obtain feature vectors. Feature data is produced from the read teacher data by obtaining data concerning a key typed by the user, data concerning the time of depressing and releasing the key, and time data related to keys typed before and after the key, as illustrated in FIG. 18 by way of example. The time intervals t1 to t3 or t4 and t5 illustrated in FIG. 18 are one example of the feature data. Pieces of feature data corresponding to all the read teacher data are obtained, and feature vectors showing the characteristic features of all the pieces of feature data are obtained.

Figure 20:
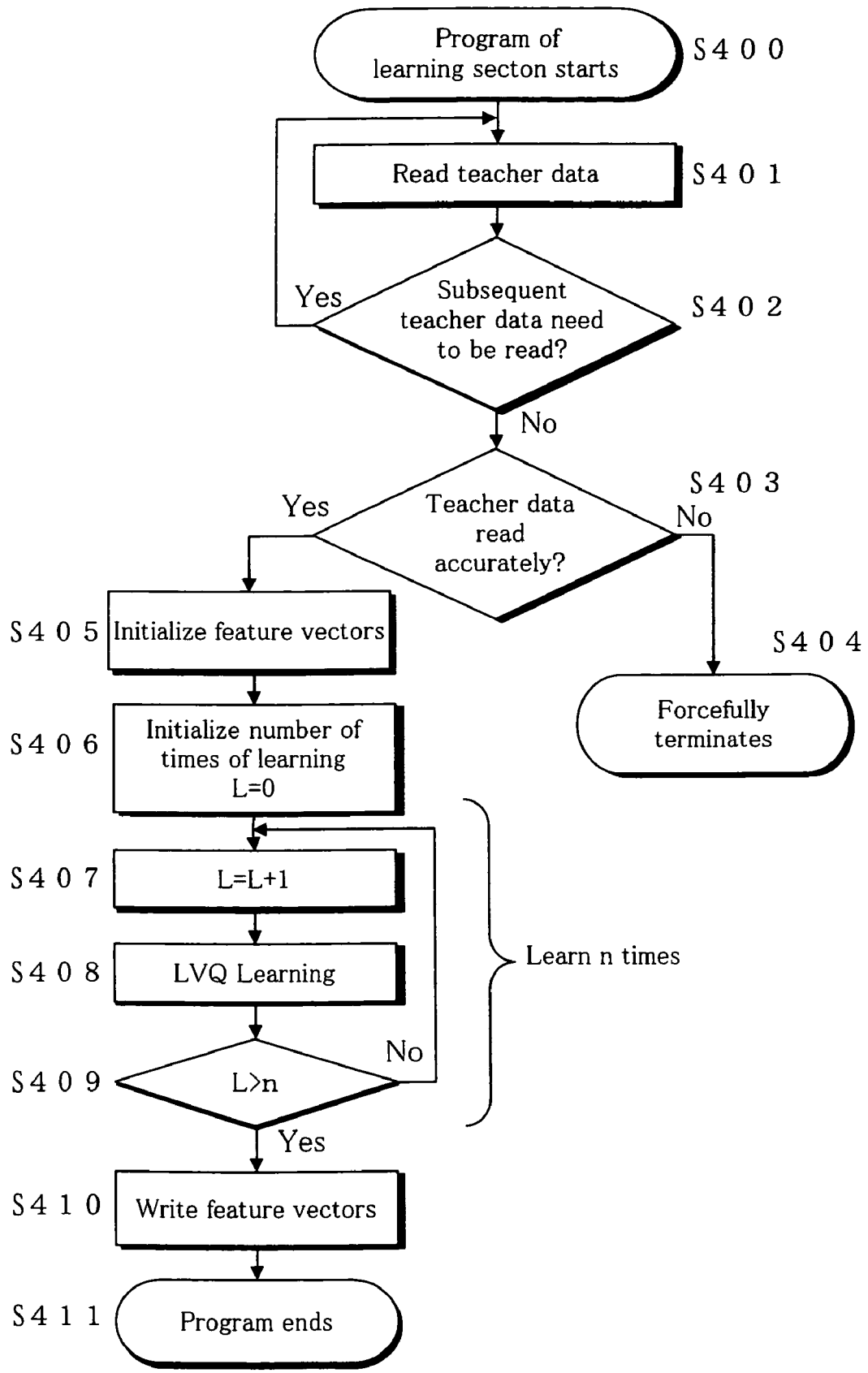
FIG. 20 is a flowchart showing an example of a program of a learning section in the sixth embodiment.

The flowchart of FIG. 20 shows the operating procedure of the learning section 208. When the user authentication program 204 in the server 202 is started, the program of the learning section 208 is executed (S400). The teacher data is read from the user database 205 stored in the server 202 (S401). The user database 205 is stored as a file in a text or binary form, for example. Subsequent teacher data is read until a specified number of pieces of teacher data have been read (S402→S401).

It is judged whether or not the teacher data has been read accurately (S403). If the teacher data has not accurately been read, the program of the learning section 208 is forcefully terminated (S404). If the teacher data has been read accurately, the feature vectors are initialized (S405). In the initialization of the feature vectors, a specified number of feature vectors are produced and initialized by using random numbers. The random numbers assume a value between the maximum and minimum values of the vectors in each class.

Then, learning is started. The number of times of learning is initialized (L=0) (S406), and LVQ learning is performed a predetermined number n of times (S407 to S409). In the LVQ learning, feature vectors are updated as expressed by Eq. 1. The learning is performed with σ fixed at 0.1.

After the learning has been performed a predetermined number n of times, the feature vectors updated as the result of learning are written in memory (S410), and the program of the learning section 208 ends (S411). The feature vectors are outputted in a text or binary form and stored in the storage device of the server 402.

[Identifying Section 209]

Figure 21:
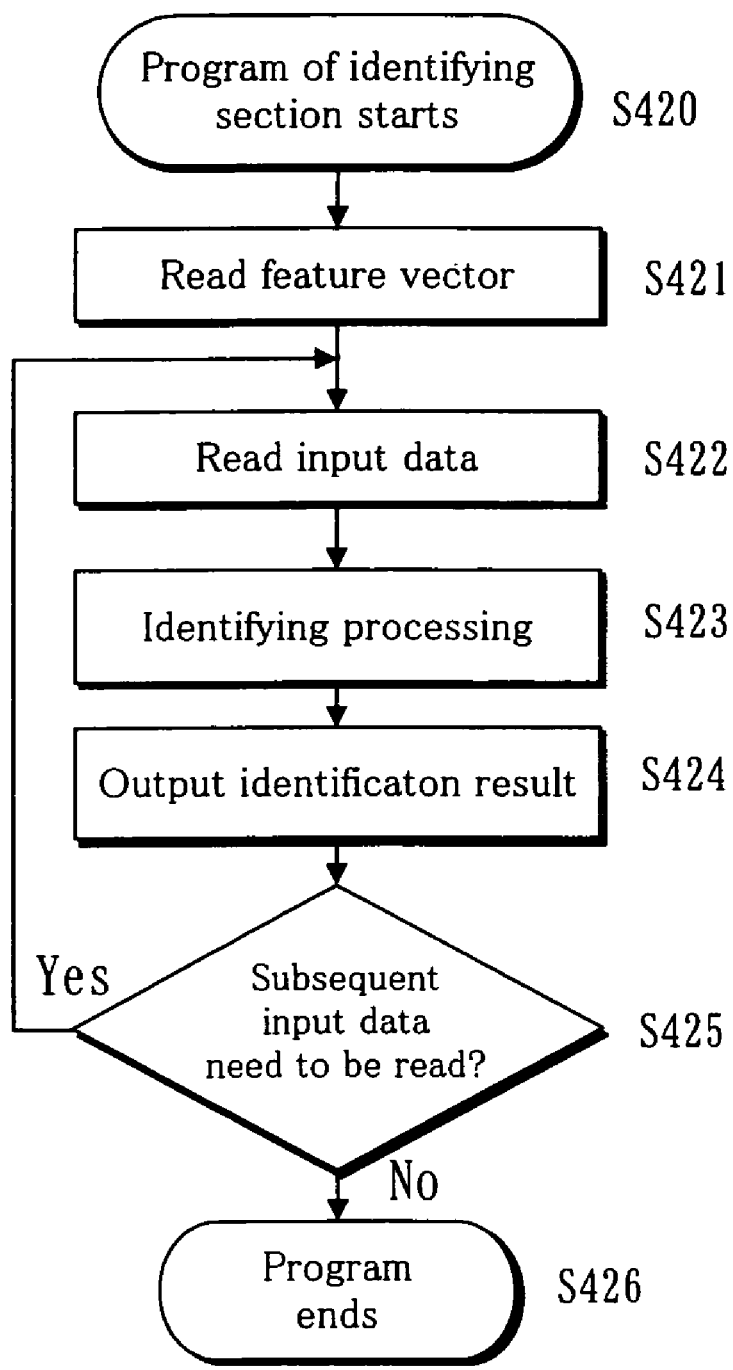
FIG. 21 is a flowchart showing an example of a program of an identifying section in the sixth embodiment.

Upon completion of the program of the learning section 208 executed to output feature vectors, the program of the identifying section 209 is executed. The flowchart of FIG. 21 shows the procedure of the program of the identifying section 209. When the program of the identifying section 209 is started (S420), the feature vectors outputted by the learning section 208 are read (S421). Then, input data concerning the user to be authenticated is read (S422).

The input data has already been transmitted from the client 201 and stored in the server 202 as the input data file 206. Upon completion of reading the input data, identifying processing is performed (S423). Upon completion of the identifying processing, the identification result is outputted (S424), and subsequent input data is read to perform identification (S425→S422) If there is no subsequent input data or a terminating instruction is received, the program is terminated (S426)

[Identification Result]

The identification result outputted by the program of the identifying section 209 is stored as a file in a text or binary form in the storage device of the server 202. FIG. 22 shows an example of identification results, which are shown in a table consisting of the row of "Read Files" 220 and the column of "Identification Results" 221. The row of "Read Files" 220 consists of rows "A", "B", . . . , "G", and the column of "Identification Results" 221 consists of columns "A", "B", . . . , "G".

Each row of "Read Files" 220 shows input data, and each column of "Identification Results" 221 shows each feature vector of teacher data. The cell at the intersection between each row and each column shows the proportion (percent) in which input data belongs to the corresponding feature vector. The program of the identifying section 209 reads "Read File A" 222, which is input data, and determines which feature vector this input data belongs to, and then outputs the result in percent.

From this table, it is possible to judge who is entering data from the keyboard of the client 201. Regarding the user of "Read File A" 222, the possibility that he or she may be a user having "Feature Vector A" 224 is "75%". The possibility that the user of "Read File A" 222 may be a user having "Feature Vector B" 225 is "6%". Regarding the user of "Read File B" 223, the possibility that he or she may be a user having "Feature Vector A" 224 is "0%". The possibility that the user of "Read File B" 223 may be a user having "Feature Vector B" 225 is "100%".

As will be understood from the above, the results of the identification vary according to each individual user's data entry characteristics. For a particular user, the identification result may be "100%". However, if the data entry characteristics of one user are similar to those of another, the identification result may be of the order of "70%" to "80%".

FIELD OF INDUSTRIAL APPLICATION

The present invention extracts accurate timing of data entry from a keyboard in the kernel mode and hence allows security to be ensured even more if the present invention is used by being incorporated in management systems in fields related to security protection where the accuracy of timing extraction is demanded, e.g. management systems handling personal data, national classified information, corporate secret data, etc.

What is claimed is:

1. A personal authentication method for use in a network system, said network system comprising
   an electronic computer connected with a plurality of devices, including a first network card for connecting to said network system and an input device, and operated by an operating system, and having device drivers for controlling said devices, and
   a server comprising a second network card for connecting to said network system and storage means for storing a database, including personal information concerning a user using the electronic computer;
   wherein said electronic computer has a common interface means comprising
      an application interface means for receiving commands from an application program executed in said electronic computer, and transmitting received commands to a next flow controlling means, and informing said application program of executed results executed by these commands, said executed results contains data received from said device driver controlled by said commands or data received from said flow controlling means,
      an interface means for obtaining input information by accessing to said device driver,
      a data processing means for producing said transmitting data by adding information concerning time of said access to said input information, or by encrypting said input information, or by decrypting said encrypted input information, a network transmitting means for performing transmitting and receiving said transmitting data to said first network card, and a flow controlling means for executing commands of said server or transmitting to said application interface, after analyzing said transmitted data which is received from said server;

wherein when said user actuates said input device, said input information obtained by said interface means from said device driver of said input device;

input information including an actuation time is transmitted to said server by said first network card;

said server receives said input information by said second network card, analyzes said input information, and obtains actuation characteristics of actuation of said input device by said user;

said server performs personal authentication of said user by comparing said actuating characteristics with said personal information.

2. A personal authentication method according to claim 1, wherein said input device is a keyboard, wherein said actuation time is time information using first time information obtained when said user depresses one key of said keyboard, or second time information obtained when said user releases said key or another key after said key has been depressed.

3. A personal authentication method according to claim 1 or 2, wherein said actuation time is at least one time selected from the group consisting of:

a first time that is a time interval from when one key of said keyboard is depressed until this key is released;

a second time that is a time interval from when one key of said keyboard is depressed until another key is subsequently depressed;

a third time that is a time interval from when one key of said keyboard is released until another key is subsequently depressed; and a fourth time that is a time interval from when one key of said keyboard is released until another key is subsequently released.

4. A personal authentication method according to claim 1, wherein said personal authentication uses a learning vector quantization method, which is a neural network technique.

5. A personal authentication method according to claim 4, wherein said learning vector quantization method comprises the steps of:

obtaining feature vectors representing features of teacher data comprising said personal information by learning, wherein said learning is performed by updating said feature vectors according to the following equation:

$$m_i(t+1)=m_i(t)-\sigma(t)[x(t)-m_i(t)]$$

$$m_j(t+1)=m_j(t)+\sigma(t)[x(t)-m_j(t)]$$

$$m_k(t+1)=m_k(t) \text{ for } k \neq i,j$$

$$0<\sigma(t)<1 \quad \text{(Eq. 1)}$$

where $m_i$ and $m_j$ denote feature vectors at a closest distance to teacher data x, and t is a number of times of said learning, wherein $m_i$ is a closest feature vector belonging to a class different from that of said teacher data x, and $m_j$ is a closest feature vector belonging to a same class as that of said teacher data x; and obtaining a distance between input data including said actuation time and said feature vectors to identify said user.

6. A personal authentication method according to claim 5, wherein said input device is a keyboard, wherein said actuation time is at least one time selected from the group consisting of:

a first time that is a time interval from when one key of said keyboard is depressed until this key is released;

a second time that is a time interval from when one key of said keyboard is depressed until another key is subsequently depressed;

a third time that is a time interval from when one key of said keyboard is released until another key is subsequently depressed; and a fourth time that is a time interval from when one key of said keyboard is released until another key is subsequently released.

7. A personal authentication program stored in a storage medium and executed by network system, said network system comprising:

an electronic computer connected with a plurality of devices, including a first network card for connecting to said network system and an input device, and operated by an operating system, and a server comprising a second network card for connecting to said network system, and storage means for storing a database, including personal information concerning a user using said electronic computer;

said program allowing said network system to realize personal authentication of said user;

wherein said program comprising a program for said electronic computer and a program for said server;

said program for said electronic computer is a program for allowing said electronic computer to realize an obtaining function comprising:

when said user actuates said input device, an actuation time when said user actuates said input device is obtained on a kernel mode that is an operating mode in which all instructions of said operating system are executable, producing transmitting data for transmitting to said server by using input data including an actuation time, said transmitting data is transmitted to said network system by said first network card;

said program for said server is a program for allowing said server to realize next functions:

an analyzing function for receiving said transmitting data by said second network card, and obtaining actuation characteristics of said user actuating said input device by analyzing said input data, and an authentication function for authenticating said user by collating said actuating characteristics with said personal information;

wherein said obtaining function has next functions:

an application interface function for receiving commands from an application program executed in said electronic computer, and informing said application program of executed results executed by these commands, an interface function for obtaining input information by accessing to said device driver, a data processing function for producing said transmitting data by grasping said actuating time by adding information concerning time of said access to said input information, a network transmitting function for performing transmitting and receiving said transmitting data to said first network card, a flow controlling function for executing commands of said server or transmitting to said application interface, after analyzing said transmitted data which is received from said server.

8. A personal authentication program according to claim 7, wherein said data processing function comprising:
an encryption function to encrypt said transmitting data, and
a decryption function to decrypt said receiving data which is encrypted.

9. A personal authentication program according to claim 7, wherein said flow controlling function is, in the case of an unauthorized data in said receiving data which shows that said user is unauthorized, stopping, stopping for a time, or informing an administrator of said electronic computer about unauthorized information.

10. A personal authentication program according to claim 7, wherein said input device is a keyboard;
said analyzing function calculates at least one time selected from the group consisting of:
a first time that is a time interval from when one key of said keyboard is depressed until this key is released;
a second time that is a time interval from when one key of said keyboard is depressed until another key is subsequently depressed;
a third time that is a time interval from when one key of said keyboard is released until another key is subsequently depressed; and
a fourth time that is a time interval from when one key of said keyboard is released until another key is subsequently released.

11. A personal authentication program according to claim 10, wherein said actuation time is time of actuating function key of said keyboard.

12. A personal authentication program according to claim 7, wherein said personal authentication function uses a learning vector quantization method, which is a neural network technique, and comprises a learning step and an identification step.

13. A personal authentication program according to claim 12, wherein said learning step comprises:
a first step of reading said personal information;
a second step of producing feature vectors representing features of said personal information;
a third step of learning said feature vectors to obtain optimal feature vectors; and
a fourth step of outputting said optimal feature vectors.

14. A personal authentication program according to claim 12, wherein said third step comprises:
a fifth step of calculating a distance between said personal information x and each of said feature vectors to obtain a feature vector $m_i$ at a shortest distance to said personal information x;
a sixth step of obtaining a class to which said feature vector $m_i$ belongs;
a seventh step of comparing the class obtained at said sixth step with a class of said personal information x;
an eighth step of updating said feature vector according to the following equation when a result of said seventh step shows that the class obtained at said sixth step is a same as the class of said personal information x, $m_i = m_i + \sigma[x - m_i], 0 < \sigma < 1;$ a ninth step of updating said feature vector according to the following equation when the result of said seventh step shows that the class obtained at said sixth step is different from the class of said personal information x, $m_i = m_i - \sigma[x - m_i], 0 < \sigma < 1;$ and a tenth step of repeating learning at said fifth to ninth steps a predetermined number of times and outputting results of the learning as said optimal feature vectors.

15. A personal authentication program according to claim 12 or 13, wherein said identification step comprises:
an eleventh step of reading the optimal feature vectors produced by said learning step;
a twelfth step of reading said input data;
a thirteenth step of calculating a distance between said input data and each of said feature vectors;
a fourteenth step of determining a feature vector at a shortest distance to said input data from a result of the calculation at said thirteenth step; and
a fifteenth step of outputting a class of said feature vector at the shortest distance determined at said fourteenth step as identification of said user.

16. A personal authentication program according to one claim selected from claims 7-9, wherein said network system is an Internet.

17. A recording medium for a personal authentication program executed by a network system, said network system comprising:
an electronic computer connected with a plurality of devices, including a first network card for connecting to said network system and an input device, and operated by an operating system, and having a device driver for controlling said device, and
a server comprising a second network card for connecting to said network system, and storage means for storing a database, including personal information concerning a user using said electronic computer;
said program allowing said network system to realize personal authentication of said user;
wherein said program comprises a program for said electronic computer and a program for said server;
said program for said electronic computer is a program for allowing said electronic computer to realize an obtaining function comprising:
when said user actuates said input device, an actuation time when said user actuates said input device is obtained in a kernel mode that is an operating mode in which all instructions of said operating system are executable,
producing transmitting data for transmitting to said server by using input data including said actuation time,
said transmitting data is transmitted to said network system by said first network card;
said program for said server is a program for allowing said server to realize next functions:
an analyzing function for receiving said transmitting data by said second network card, and obtaining actuation characteristics of said user actuating said input device by analyzing said input data, and
an authentication function for authenticating said user by collating said actuating characteristics with said personal information;
wherein said obtaining function has next functions:
an application interface function for receiving commands from an application program executed in said electronic computer, and informing said application program about executed results executed by these commands,
an interface function for obtaining input information by accessing to said device driver, a data processing function for producing said transmitting data by grasping said actuating time by adding information concerning time of said access to said input information, a network transmitting function for performing transmitting and receiving said transmitting data to said first network card, and a flow controlling function for executing commands of said server or transmitting to said application interface, after analyzing said transmitted data which is received from said server.

18. A recording medium according to claim 17, wherein said data processing function comprising:

an encryption function to encrypt said transmitting data, and a decryption function to decrypt said receiving data which is encrypted.

19. A recording medium according to claim 17, wherein said flow controlling function is, in the case of an unauthorized data in said receiving data which shows said user is unauthorized, stopping, stopping for a time, or informing an administrator of said electronic computer about unauthorized information.

20. A recording medium according to claim 17, wherein said input device is a keyboard;

said analyzing function calculates at least one time selected from the group consisting of:

a first time that is a time interval from when one key of said keyboard is depressed until this key is released;

a second time that is a time interval from when one key of said keyboard is depressed until another key is subsequently depressed;

a third time that is a time interval from when one key of said keyboard is released until another key is subsequently depressed; and a fourth time that is a time interval from when one key of said keyboard is released until another key is subsequently released.

21. A recording medium according to claim 20, wherein said actuation time is time of actuating function key of said keyboard.

22. A recording medium according to claim 17, wherein said personal authentication function uses a learning vector quantization method, which is a neural network technique, and comprises a learning step and an identification step.

23. A recording medium according to claim 22, wherein said learning step comprises:

a first step of reading said personal information;

a second step of producing feature vectors representing features of said personal information;

a third step of learning said feature vectors to obtain optimal feature vectors; and a fourth step of outputting said optimal feature vectors.

24. A recording medium according to claim 22, wherein said third step comprises:

a fifth step of calculating a distance between said personal information x and each of said feature vectors to obtain a feature vector $m_i$ at a shortest distance to said personal information x;

a sixth step of obtaining a class to which said feature vector $m_i$ belongs;

a seventh step of comparing the class obtained at said sixth step with a class of said personal information x;

an eighth step of updating said feature vector according to the following equation when a result of said seventh step shows that the class obtained at said sixth step is a same as the class of said personal information x, $$m_i = m_i + \sigma[x - m_i], \ 0 < \sigma < 1;$$

a ninth step of updating said feature vector according to the following equation when the result of said seventh step shows that the class obtained at said sixth step is different from the class of said personal information x, $$m_i = m_i - \sigma[x - m_i], \ 0 < \sigma < 1; \text{ and}$$

a tenth step of repeating learning at said fifth to ninth steps a predetermined number of times and outputting results of the learning as said optimal feature vectors.

25. A recording medium according to claim 22 or 23, wherein said identification step comprises:

an eleventh step of reading the optimal feature vectors produced by said learning step;

a twelfth step of reading said input data;

a thirteenth step of calculating a distance between said input data and each of said feature vectors;

a fourteenth step of determining a feature vector at a shortest distance to said input data from a result of the calculation at said thirteenth step; and a fifteenth step of outputting a class of said feature vector at the shortest distance determined at said fourteenth step as identification of said user.

26. A recording medium according to one claim selected from claims 17 to 18, wherein said network system is an Internet.

27. A recording medium according to claim 17, wherein said database has a code for identifying said key, a time at which said key is depressed or released, and identification indicating that said key is depressed or released, storing said identifying result in a storing medium as producing a result file for each said user, or adding said result file.

* * * * *